(12) United States Patent
Giurgiutiu et al.

(10) Patent No.: US 10,983,095 B2
(45) Date of Patent: Apr. 20, 2021

(54) COMBINED GLOBAL-LOCAL STRUCTURAL HEALTH MONITORING

(71) Applicant: UNIVERSITY OF SOUTH CAROLINA, Columbia, SC (US)

(72) Inventors: Victor Giurgiutiu, Columbia, SC (US); Mohammad Faisal Haider, West Columbia, SC (US); Banibrata Poddar, Rockville, MD (US)

(73) Assignees: University of South Carolina, Columbia, SC (US); Intelligent Automation, Inc., Rockville, MD (US)

( * ) Notice: Subject to any disclaimer, the term of this patent is extended or adjusted under 35 U.S.C. 154(b) by 40 days.

(21) Appl. No.: 16/397,285

(22) Filed: Apr. 29, 2019

(65) Prior Publication Data

US 2019/0353620 A1 Nov. 21, 2019

Related U.S. Application Data

(60) Provisional application No. 62/672,179, filed on May 16, 2018.

(51) Int. Cl.
*G01N 29/04* (2006.01)
*G01N 29/24* (2006.01)
*G01N 29/07* (2006.01)

(52) U.S. Cl.
CPC .......... *G01N 29/041* (2013.01); *G01N 29/07* (2013.01); *G01N 29/2437* (2013.01); *G01N 2291/0258* (2013.01); *G01N 2291/0427* (2013.01)

(58) Field of Classification Search
CPC .... G01N 29/041; G01N 29/043; G01N 29/07; G01N 29/2437; G01N 29/4427;
(Continued)

(56) References Cited

U.S. PATENT DOCUMENTS 2,440,198 A 4/1948 Green
3,713,127 A 1/1973 Keledy et al.
(Continued)

FOREIGN PATENT DOCUMENTS

CN 102880768 1/2013
CN 104280455 1/2015
(Continued)

OTHER PUBLICATIONS

Ahmad, et al. "Simulation of Lamb wave reflections at plate edges using the semi-analytical finite element method" *Ultrasonics* 52(7) (2012) pp. 815-820.
(Continued)

*Primary Examiner* — Helen C Kwok
(74) *Attorney, Agent, or Firm* — Dority & Manning, P.A.

(57) ABSTRACT

Computationally efficient, highly accurate, and cost-effective approach for detection of damage in a structure is described. Methods include a combined analysis in both global and local regions of a structure to predict the received wave signals at a location due to scattering of Lamb waves at a damage site. Through comparison of an actual received wave signal with the predicted signals, identification of damage location and/or type can be provided. Methods can be particularly beneficial when considering damage assessment in a complex structure that includes plate-like structures that include an extension off of a base plate, e.g., a stiffened structure.

17 Claims, 17 Drawing Sheets

(58) Field of Classification Search
CPC .............. G01N 29/348; G01N 29/069; G01N 29/2475; G01N 29/075; G01N 29/262
See application file for complete search history.

(56) References Cited

U.S. PATENT DOCUMENTS

| | | | |
|---|---|---|---|
| 4,679,430 A * | 7/1987 | Scott-Kestin | ....... G01F 23/2961 340/621 |
| 4,821,575 A | 4/1989 | Fujikake et al. | |
| 4,995,260 A | 2/1991 | Deason et al. | |
| 5,167,157 A | 12/1992 | Wertz et al. | |
| 5,814,729 A | 9/1998 | Wu et al. | |
| 6,006,163 A | 12/1999 | Lichtenwalner et al. | |
| 6,276,209 B1 * | 8/2001 | Schafer | .................. G01N 29/07 73/597 |
| 6,768,312 B2 | 7/2004 | Sun et al. | |
| 6,996,480 B2 | 2/2006 | Giurgiutiu et al. | |
| 7,024,315 B2 * | 4/2006 | Giurgiutiu | .............. G01N 29/11 702/33 |
| 7,034,660 B2 | 4/2006 | Watters et al. | |
| 7,174,255 B2 | 2/2007 | Giurgiutiu et al. | |
| 7,881,881 B2 | 2/2011 | Giurgiutiu et al. | |
| 8,102,101 B2 | 1/2012 | Giurgiutiu et al. | |
| 8,447,530 B2 | 5/2013 | Pado et al. | |
| 8,960,005 B2 * | 2/2015 | Ruzzene | ................ G01N 29/12 73/596 |
| 9,158,054 B2 | 10/2015 | Giurgiutiu et al. | |
| 9,950,715 B2 * | 4/2018 | Lanza di Scalea | ...... B61K 9/10 |
| 10,234,432 B2 * | 3/2019 | Senderos | ............. G01N 29/223 |
| 10,724,994 B2 * | 7/2020 | Van Tooren | ........... G01N 29/44 |
| 2002/0134161 A1 * | 9/2002 | Chinn | .................... G01N 29/07 73/622 |
| 2002/0154029 A1 | 10/2002 | Watters et al. | |
| 2003/0009300 A1 | 1/2003 | Giurgiutiu | |
| 2005/0144045 A1 | 5/2005 | Giurgiutiu et al. | |
| 2005/0228597 A1 | 10/2005 | Giurgiutiu et al. | |
| 2007/0167133 A1 * | 7/2007 | Tomlinson, Jr. | ....... G01N 29/11 455/39 |
| 2008/0288184 A1 | 11/2008 | Giurgiutiu et al. | |
| 2009/0048789 A1 | 2/2009 | Yu et al. | |
| 2009/0182515 A1 | 7/2009 | Pado et al. | |
| 2009/0188319 A1 | 7/2009 | Giurgiutiu et al. | |
| 2009/0301198 A1 * | 12/2009 | Sohn | .................... G01N 29/348 73/598 |
| 2010/0042338 A1 | 2/2010 | Giurgiutiu et al. | |
| 2010/0132469 A1 | 6/2010 | Giurgiutiu et al. | |
| 2012/0280414 A1 | 11/2012 | Giurgiutiu et al. | |
| 2013/0129275 A1 | 5/2013 | Giurgiutiu et al. | |
| 2017/0168021 A1 | 6/2017 | Van Tooren et al. | |
| 2018/0128094 A1 * | 5/2018 | Merciu | .................... G01V 1/50 |

FOREIGN PATENT DOCUMENTS

| | | |
|---|---|---|
| CN | 104406901 | 3/2015 |
| CN | 204719133 | 10/2015 |
| CN | 105372330 | 3/2016 |
| CN | 106053595 | 10/2016 |
| CN | 106990170 | 7/2017 |
| CN | 107144643 | 9/2017 |

OTHER PUBLICATIONS

Alleyne, et al. "The Interaction of Lamb Waves with Defects" *IEEE Trans. Ultrason. Ferroelectr. Freq. Control.* 39(3) (1992) pp. 381-397.
Assouli, et al. "Detection and identification of concrete cracking during corrosion of reinforced concrete by acoustic emission coupled to the electrochemical techniques" *NDT&E International* 38(8) (2005) pp. 682-689.
Bai, et al. "Three-dimensional steady state Green function for a layered isotropic plate" *J. Sound Vib.* 269(1-2) (2004) pp. 251-271.
Benmeddour, et al. "Study of the fundamental Lamb modes interaction with asymmetrical discontinuities" *NDT&E Int.* 41 (2008) pp. 330-340.
Bhuiyan, et al. "Guided wave based crack detection in the rivet hole using global analytical with local FEM approach" *Materials* 9(602) (2016) pp. 1-19.
Castaings, et al. "Modal decomposition method for modeling the interaction of Lamb waves with cracks" *J. Acoust. Soc. Am.* 112(6) (2002) pp. 2567-2582.
Cerna, et al. "The Fundamentals of FFT-Based Signal Analysis and Measurement" *National Instruments* 041 (2000) pp. 1-20.
Cho, et al. "An elastodynamic hybrid boundary element study for elastic guided wave interactions with a surface breaking defect" *Int. J. Solids Struct.* 37(30) (2000) pp. 4103-4124.
Cho, et al. "A boundary element solution for a mode conversion study on the edge reflection of Lamb waves" *J. Acoust. Soc. Am.* 99(4) (1996) pp. 2097-2109. (Abstract only).
Coppola, et al. "Analysis of Feasibility on the Use of Fiber Bragg Grating Sensors as Ultrasound Detectors" *Smart Structures and Materials 2001* 4328 (2001) pp. 224-232.
Creason, et al. "Fourier Transform Faradaic Admittance Measurements: Demonstration of the Applicability of Random and Pseudo-Random Noise as Applied Potential" *Electroanalytical Chemistry and Interfacial Electrochemistry* 36 (1972) pp. 1-7.
Darowicki, et al. "Continuous-frequency Method of Measurement of Electrode Impedance" *Instrumentation Science & Technology* 31(1) (2003) pp. 53-62.
Denis, et al. "Scattering effects induced by imperfections on an acoustic black hole placed at a structural waveguide termination" *Journal of Sound and Vibration* 362 (2016) pp. 56-71.
Doblhofer, et al. "Laplace Place Analysis of the Faradaic and Non-Faradaic Impedance of the Mercury Electrode" *Electroanalytical Chemistry and Interfacial Electrochemistry* 39(1) (1972) pp. 91-102.
Elbatanouny, et al. "Identification of Cracking Mechanisms in Scaled FRP Reinforced Concrete Beams using Acoustic Emission" *Experimental Mechanics* 54 (2014) pp. 69-82.
Farrar, et al. "An introduction to structural health monitoring" *Philos. Trans. R. Soc. A Math. Phys. Eng. Sci.* 365 (2007) pp. 303-315.
Flores-López, et al. "Scattering of Rayleigh-Lamb waves by a surface breaking crack in an elastic plate" *J. Acoust. Soc. Am.* 119(4) (2006) pp. 2041-2049. (Abstract only).
Friswell, M.I. "Damage identification using inverse methods" *Philos. Trans. R. Soc. A Math. Phys. Eng. Sci.* 365 (2007) pp. 393-410.
Galán, et al. "Lamb mode conversion at edges. A hybrid boundary element-finite-element solution" *J. Acoust. Soc. Am.* 117(4) (2005) pp. 1777-1784.
Giurgiutiu, V. "Predictive simulation of guide-wave structural health monitoring" *Health Monitoring of Structural and Biological Systems* 10170:1017002 (2017) pp. 1-20.
Giurgiutiu, et al. "Structural Health Monitoring with Piezoelectric Wafer Active Sensors" *AIAA Journal* 49(3) (2011) pp. 565-581.
Giurgiutiu, et al. "Development of a Field-Portable Small-Size Impedance Analyzer for Structural Health Monitoring Using the Electromechanical Impedance Technique" *Smart Structures and Materials 2004* 5391 (2004) pp. 774-786.
Giurgiutiu, et al. "Embedded Active Sensors for in-Situ Structural Health Monitoring of Aging Aircraft Structures" *Struct. Heal. Monit.* 1 (2001) pp. 1-10.
Grahn, T. "Lamb wave scattering from a circular partly through-thickness hole in a plate" *Wave Motion* 37(1) (2003) pp. 63-80.
Gregory, et al. "The cantilever beam under tension, bending or flexure at infinity" *J. Elast.* 12(4) (1982) pp. 317-343. (Abstract only).
Grondel, et al. "Chapter 4: Application of the Piezoelectricity in an Active and Passive Health Monitoring System" *Piezoelectric Materials and Devices—Practices and Applications* (2013) pp. 69-92.
Haider, et al. "A Novel Analytical Approach to Determine Scattering of Lamb Waves in a Plate with Cracked Stiffener using Complex Modes Expansion with Vector Projection" *J. Intell. Mater. Syst. Struct.* (2018).

(56) References Cited

OTHER PUBLICATIONS

Haider, et al. "Analysis of axis symmetric circular crested elastic wave generated during crack propagation in a plate: A Helmholtz potential technique" *Int. J. Solids Struct.* 134 (2018) pp. 130-150.
Haider, et al. "A Helmholtz Potential Approach to the Analysis of Guided Wave Generation During Acoustic Emission Events" *J. Nondestruct. Eval. Diag. Progn. Eng. Syst.* 1:21002 (2017) pp. 1-11.
Haider, et al. "Simulation of Lamb Wave Propagation Using Excitation Potentials" *ASME Pressure Vessels and Piping Conference* 66074 (2017) pp. 1-7.
Idrissi, et al. "Study and characterization by acoustic emission and electrochemical measurements of concrete deterioration caused by reinforcement steel corrosion" —*NDT&E International* 36(8) (2003) pp. 563-569.
Inman, D.J. "Smart Materials in Damage Detection and Prognosis" *Key Engineering Materials* 245-246 (2003) pp. 3-16.
Koshiba, et al. "Finite-element Analysis of Lamb Wave Scattering in an Elastic Plate Waveguide" *IEEE Trans. Sonics and Ultrason.* 31(1) (1984) pp. 18-24.
Krylov, V. "Geometric acoustics approximation for Rayleigh and Lamb waves" *9th International Conference on Condition Monitoring and Machinery Failure Prevention Technologies* (2012) pp. 1-12.
Lee, et al. "Modelling of Lamb waves for damage detection in metallic structures : Part I. Wave propagation" *Smart Mater. Struct.* 12(5) (2003) pp. 804-814.
Lee, et al. "Modelling of Lamb waves for damage detection in metallic structures : Part II. Wave interactions with damage" *Smart Mater. Struct.* 12(5) (2003) p. 815.
Liu, et al. "A Benchmark Study of Modeling Lamb Wave Scattering by a Through Hole Using a Time-Domain Spectral Element Method" *J. Nondestruct. Eval. Diagnostics Progn. Eng. Syst.* 1(2):21006.
Lomonosov, et al. "Orbital-type trapping of elastic Lamb waves" *Ultrasonics* 64 (2016) pp. 58-61.
Lowe, et al. "Diligent, Prediction and Measurement of the Reflection of the Fundamental Anti-Symmetric Lamb Wave from Cracks and Notches" *AIP Conf. Proc.* 509(1) (2000) pp. 193-200.
Luo, et al. "Numerical Analysis and Optimization of Optical Spectral Characteristics of Fiber Bragg Gratings Modulated by a Transverse Acoustic Wave" *Applied Optics* 46(28) (2007) pp. 6959-6965.
Mackerle, J. "Finite-element modelling of non-destructive material evaluation, an addendum: A bibliography (1997-2003)" *Model. Simul. Mater. Sci. Eng.* 12(5) (2004) pp. 799-834.
Mangual, et al. "Acoustic-Emission-Based Characterization of Corrosion Damage in Cracked Concrete with Prestressing Strand" *ACI Materials Journal* 110(1) (2013) pp. 89-98.
Minardo, et al. "Response of Fiber Bragg Gratings to Longitudinal Ultrasonic Waves" *IEEE Transactions on Ultrasonics, Ferroelectrics and Frequency Control* 52(2) (2005) pp. 304-312.
Moreau, et al. "Scattering of guided waves by flat-bottomed cavities with irregular shapes" *Wave Motion* 49(2) (2012) pp. 375-387.
Moser, et al. "Modeling elastic wave propagation in waveguides with the finite element method" *NDT&E Int.* 32(4) (1999) pp. 225-234.
Pardo De Vera, et al. "Embedded Self-Sensing Piezoelectric for Damage Detection" *Journal of Intelligent Material Systems and Structures* 9 (1998) pp. 876-882.
Park, et al. "PZT-based active damage detection techniques for steel bridge components" *Smart Mater. Struct.* 15 (2006) pp. 957-966.

Peairs, et al. "Improving Accessibility of the Impedance-Based Structural Health Monitoring Method" *Journal of Intelligent Materials Systems and Structures* 15 (2004) pp. 129-139.
Peairs, et al. "Low Cost Impedance Monitoring Using Smart Materials" *Proceeding of the First European Workshop on Structural Health Monitoring* (2002).
Poddar, et al. "Complex modes expansion with vector projection using power flow to simulate Lamb waves scattering from horizontal cracks and disbonds" *J. Acoust. Soc. Am.* 140(3) (2016) pp. 2123-2133.
Poddar, et al. "Scattering of Lamb waves from a discontinuity: An improved analytical approach" *Wave Motion* 65 (2016) pp. 79-91.
Raghavan, et al. "Finite-dimensional piezoelectric transducer modeling for guided wave based structural health monitoring" *Smart Mater. Struct.* 14 (2005) pp. 1448-1461.
Santhanam, et al. "Reflection of Lamb waves obliquely incident on the free edge of a plate" *Ultrasonics* 53 (2013) pp. 271-282.
Searle, et al. "Real time impedance plots with arbitrary frequency components" *Physiological Measurement* 20 (1999) pp. 103-114.
Shen, et al. "Combined analytical FEM approach for efficient simulation of Lamb wave damage detection" *Ultrasonics* 69 (2016) pp. 116-128.
Shen, et al. "Effective non-reflective boundary for Lamb waves: Theory, finite element implementation, and applications" *Wave Motion* 58 (2015) pp. 22-41.
Shen, et al. "WaveFormRevealer: An analytical framework and predictive tool for the simulation of multi-modal guided wave propagation and interaction with damage" *Struct. Heal. Monit.* 13 (2014) pp. 491-511.
Sierra-Alcazar, et al. "An Assessment of the Measurements of Impedance by Analysis of a Pulse Using an On-line Computer" *Journal of Electroanalytical Chemistry and Interfacial Electrochemistry* 87(3) (1978) pp. 399-345.
Tandon, et al. "A review of vibration and acoustics measurement methods for the detection of defects in rolling element bearing" *Tribol. Int.* 32 (1999) pp. 469-480.
Terrien, et al. "A combined finite element and modal decomposition method to study the interaction of Lamb modes with micro-defects" *Ultrasonics* 46(1) (2007) pp. 74-88.
Tua, et al. "Detection of cracks in plates using piezo-actuated Lamb waves" *Smart Mater. Struct.* 13(4) (2004) pp. 643-660.
Wevers, et al. "Ultrasonic Lamb Wave Inspection of Aircraft Components Using Integrated Optical Fibre Sensing Technology" *ECNDT* Mo.2.7.1 (2006), pp. 1-10.
Wevers, M. "Listening to the sound of materials: Acoustic emission for the analysis of material behavior" *NDT&E Int.* 30 (1997) pp. 99-106.
Yu, et al. "Multi-mode Damage Detection Methods with Piezoelectric Wafer Active Sensors" *Journal of Intelligent Material Systems and Structures* 20 (2009) pp. 1329-1341.
Yu, et al. "In-situ 2-D piezoelectric wafer active sensors arrays for guided wave damage detection" *Journal of Ultrasonics* 48(2) (2008) pp. 117-134.
Yu, L. "In-Situ Structural Health Monitoring with Piezoelectric Wafer Active Sensor Guided-Wave Phased Arrays" *University of South Carolina* (2006) pp. 1-359.
Ziehl, P. "Applications of Acoustic Emission Evaluation for Civil Infrastructure" *Smart Structures & Materials* (2008) pp. 1-9.

\* cited by examiner

GLOBAL-LOCAL ANALYTICAL PREDICTION

EXPERIMENTAL MEASUREMENT

COMBINED GLOBAL-LOCAL STRUCTURAL HEALTH MONITORING

CROSS REFERENCE TO RELATED APPLICATION

This application claims filing benefit of U.S. Provisional Patent Application Ser. No. 62/672,179, having a filing date of May 16, 2018, entitled "Analytical Global-Local (AGL) Prediction of Guided Wave Scattering from Discontinuities," which is incorporated herein by reference for all purposes.

FEDERAL RESEARCH STATEMENT

This invention was made with Government support under Grant No. NNX17CL69P, awarded by the National Aeronautics and Space Administration. The Government has certain rights in the invention.

BACKGROUND

Structural Health Monitoring (SHM) is used to determine the condition of a structure by use of sensors that are attached, embedded in or otherwise in communication with the structure. SHM is performed with either a passive or an active system. Passive SHM includes monitoring one or more of a number of parameters including, but not limited to, loading stress, environmental action, performance indicators, and acoustic emission (for instance from cracks). Active SHM utilizes proactive interrogation of sensors embedded in/on the structure to detect damage and thereby determine a more detailed analysis. Methods used for active SHM resemble those of nondestructive evaluation (NDE), e.g., ultrasonics, eddy currents, etc., with one difference being that the active SHM methods can be carried out with permanently affixed sensors. One widely used active SHM method employs embedded piezoelectric wafer active sensors (PWAS) as guided wave transmitters and receivers to determine the presence of cracks, delamination, dis-bonds, corrosion, etc. Due to similarities to NDE ultrasonics, this approach is also known as embedded ultrasonics.

Guided waves can travel a long distance through large plate-like members and interact with damage and as such are very useful for SHM. Lamb waves are a type of guided waves that propagate in a relatively thin (with reference to the propagating wavelength) plate of relatively large surface area. The basic principle of Lamb wave-based damage detection for SHM applications includes investigation and analysis of the incidence, reflection, transmission, and conversion of Lamb wave modes as they interact with damage in a structure. Upon damage interaction, Lamb waves will scatter, and accurate detection and analysis of the scattered waves can provide information concerning the presence, type and level of damage.

Finite element method (FEM), boundary element method (BEM) and other numerical techniques have been used in the study of propagating elastic waves for detection of structural flaws and damage. However, FEM and BEM require extensive computation for a large structure, and it is difficult to attain computational accuracy by these methods. To improve results, researchers have adopted semi-analytical finite element (SAFE) methods. In this approach, in-plane displacement is accommodated by means of an analytical double integral Fourier transform, while the anti-plane displacement is approximated by using finite elements. Other researchers have adopted a combined global analytical-local FEM analysis. This approach couples the global analytical wave expression with the local FEM analysis around the damage, incorporating wave damage interaction coefficients. This method can show a higher computation efficiency as compared to an entire FEM analysis of the model, but the FEM analysis over local damage remains quite time-consuming. Spectral Finite Element Method (SFEM), which is a particular FEM formulated in the frequency domain, is another approach. This method expands the unknown solution in trigonometric series (harmonic waves in time and space). The exact wave propagation solution is used as the interpolating function for finite element formulation. The constants of the solution are made to satisfy the boundary conditions in the frequency domain, and thus all the requirements are satisfied at each frequency and time domain data can be obtained.

The interaction of Lamb waves with structural damage is a complex phenomenon and damage characterization requires both fast and accurate analysis and prediction of scattered waves. Existing complexity in the structure (e.g., a stiffener) makes the physics of wave propagation even more complicated. One of the main challenges of accurate SHM and damage detection through guided wave analysis remains solution of the scattering problem and in particular satisfaction of the thickness dependent boundary conditions at a discontinuity. Unfortunately, existing technologies have proven to be not very stable and to have slow convergence, particularly for complex structures, and in practice it has proven extremely difficult to distinguish a scattered wave field from the overall Lamb wave fields.

What are needed in the art are SHM methods based on the physics of Lamb wave propagation that are both highly efficient and accurate. An approach that provides for analysis of guided waves in a structure in an efficient manor so as to quickly provide accurate understanding of the presence of damage in the structure, particularly a complex structure, would be of great benefit.

SUMMARY

Disclosed are systems and methods for SHM and detection of the presence and/or type of damage in a structure. For instance, a method can include exciting a Lamb wave in a structure such that the Lamb wave propagates through a base plate of the structure. In one embodiment, the structure can be a complex structure that includes the base plate and an extension such as a stiffener extending from the base plate with a joint area where the base plate and the extension meet. In this embodiment, the Lamb wave can be excited in the base plate and can propagate through the base plate and through the joint area. A method can also include detecting a scattered Lamb wave at a receiver, the scattered Lamb wave being a resulting wave generated by passage of the Lamb wave through the structure.

A method can also include analyzing the scattered Lamb wave by use of a computing system. The analysis can incorporate the use of scattering coefficients of Lamb wave modes, e.g., frequency-dependent transmission and reflection coefficients, that have been previously determined from geometric discontinuities for pristine (undamaged) and damaged structures by use of complex modes expansion with vector projection (CMEP). The signal analysis includes insertion of the scattering coefficients into a global analytical model to provide signal solutions that predict the scattered signal (e.g., the time-dependent scattered signal) that would be obtained if the structure is damaged or alternatively if the structure is undamaged. The resulting signal solutions can then be compared to the scattered Lamb wave signal obtained during the testing and by that comparison, a health state for the structure can be determined, e.g., that the structure has been damaged.

The systems and methods of the present disclosure have a technical effect of permitting detection and recognition of structural damage and can do so with increased computational efficiency and much higher confidence than was possible with previous approaches.

The systems and methods of the present disclosure are also directed to a practical application of computing technology. In particular, various specific technical implementations of computerized systems and methods are described herein which are practically applied to the specific tasks of identifying the presence and/or type of damage in a structure, and in one particular embodiment, in a complex structure as may be present in a transportation vehicle, e.g., a stiffened plate used as a structural support in an airplane. Thus, example embodiments of the present disclosure are directed to a particular technological environment and field of technology such as the evaluation of surfaces based on guided Lamb wave transmission, detection, and analysis.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
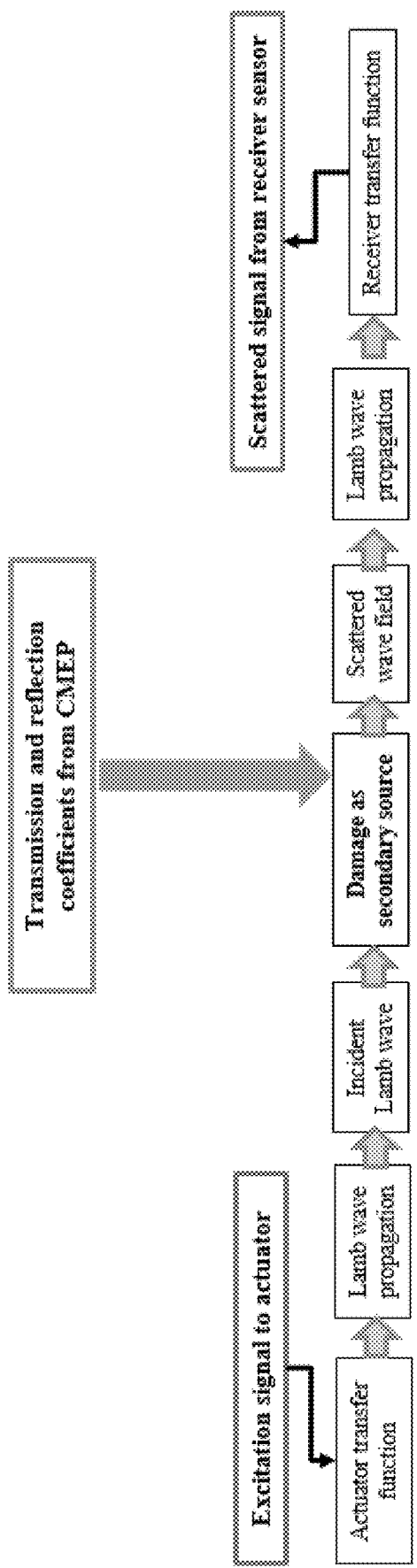
FIG. 1 presents a flow chart showing basic principles of a method as disclosed herein.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, disclosed is a computationally efficient and cost-effective approach for detection of damage in a structure. More specifically, disclosed methods provide a method for combined analysis in both a global and local region to predict the received wave signals at a location due to scattering of Lamb waves at a damage site. Through comparison of an actual received wave signal with the predicted signal, identification of damage location and/or type can be provided. Disclosed methods can be more efficient and accurate than previously known approaches and can be particularly beneficial when considering damage assessment in a complex structure that includes plate-like structures that include an extension off of a base plate, e.g., a stiffened structure.

FIG. 1 illustrates one aspect of disclosed methods. Disclosed methods utilize and provide information in both global (pristine) and local (damage) regions of a structure and encompass analytical techniques for examining information obtained from a structure, and as such the methods are referred to herein as an Analytical Global-Local (AGL) method. As indicated in FIG. 1, a method can include Lamb wave generation and propagation through a pristine (undamaged) section of a structure. Upon the incident Lamb wave encountering damage in the structure, a scattered wave field is formed which then propagates through another pristine section of the structure to a location where it is registered at a receiver. The scattered signal is then analyzed to determine the presence and/or nature of the damage in the structure. In analysis of the signal, the method can incorporate local scattering coefficients, e.g., transmission and reflection coefficients as may be determined by CMEP, to provide a specific solution to the global scattered wave field that is produced by a damaged region. Comparison of this solution to the scattered signal obtained from the receiver can inform the user to the presence and or nature of the damage in the structure.

Figure 2:
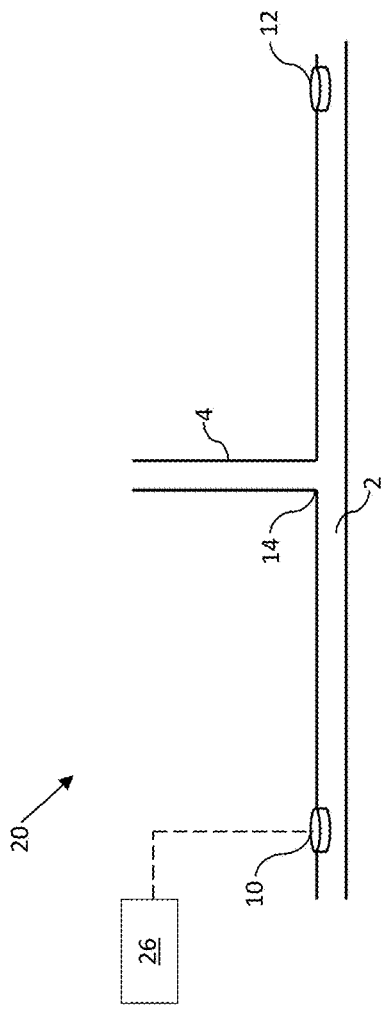
FIG. 2 schematically illustrates a structure as may be monitored by disclosed systems.

FIG. 2 schematically illustrates one embodiment of a structure 20 as may be examined according to disclosed methods. As indicated, a structure 20 can include a transmitter 10 and a receiver 12 embedded in or on a base plate 2 of the structure 20. The transmitter 10 and receiver 12 can be capable of communication with an electronic module for signal transmission/reception, processing and interpretation. Exemplary SHM system components and methods as may be included in a system have been described, for instance in U.S. Pat. Nos. 6,996,480; 7,881,881; and 7,024,315 and U.S. Patent Application Publication No. 2008/0288184, all to Giurgiutiu, et al. and all of which are incorporated herein by reference in their entirety. Of course, it should be understood that a structure can incorporate multiple transmitters 10 and receivers 12 and is not limited to a single transmitter 10 and receiver 12 or to the particular shape of the structure 20.

In one embodiment, the transmitter 10 and the receiver 12 can be piezoelectric wafer active sensors (PWAS). PWAS have emerged as a common element for SHM technology as by use of PWAS transducers, one they can apply a variety of damage detection methods including, without limitation, propagating acousto-ultrasonic waves, standing waves (electromechanical impedance) and phased arrays. PWAS attached directly to structural elements have gained large popularity due to their low cost, simplicity, and versatility. Beneficially, PWAS can be used for structural sensing through generation and detection of propagating Lamb waves through a base plate 2. Beneficially, Lamb waves are capable of coupling their energy throughout the structure thickness. These two characteristics make Lamb waves an ideal candidate for disclosed SHM applications.

During use, a generator can be operative to impress a pulse having a predetermined carrier frequency (e.g., from about 50 kHz to about 350 kHz) upon a transmitter 10 to produce ultrasonic waves over certain Lamb modes and wavelengths in the base plate 2. For instance, an excitation signal from a function generator can be sent to a transmitter 10 where the signal can be transformed to generate Lamb waves throughout the panel 2 of the structure 20. For example, a system can include a module 26 capable of wired or wireless communication with the transducers 20 that can include a tone-burst signal generator as is generally known in the art that can create a synthesized window-smoothed tone-burst signal with adjustable amplitude and repetition rate, a transmission beamformer (algorithm) at angle $\varphi_0$, a reception beamformer (algorithm) at angle $\varphi_0$, and a signal processor unit for signal deconvolution, time of flight (TOF), and range estimation.

Upon generation of the Lamb waves within the base plate 2, the Lamb waves can travel and can be reflected and/or diffracted by any structural discontinuities, boundaries, damaged areas or other anomalies. For example, the signal generation module 26 can be controlled to direct the Lamb waves to a particular area of interest such as a joint area 14 formed between the base plate 2 and a stiffener 4. The reflected/diffracted waves can then be detected by a receiver 12, where it can be transformed back into electric signals by operation of the individual sensor 12 for analysis.

Disclosed methods can incorporate the actual geometry of a structure with associated propagating and evanescent modes of Lamb waves. As such, the AGL method can be applicable to complex structures such as that illustrated in FIG. 2 as well as simple structure, e.g., more simple plate-like structures. The AGL method is based on the assumption of straight crested Lamb wave which makes it suitable to analyze large structures with different kind of damage including, without limitation, horizontal crack (directions are provided relative to the base plate through which the Lamb wave is traveling), verticle crack, disbond or delmaination, corrosion patch, etc., as well as discontinuities including, without limitation, step like change, notch, stiffener etc.

In one embodiment, a structure to be assessed according to an AGL method can include a base plate 2 and/or a stiffener 4 as illustrated in FIG. 1 as may be utilized in forming one or more walls of a multi-ribbed box structure as found on aircraft control surfaces. When present, a stiffener 4 can be of unitary construction with the base plate 2 or can be of separate construction and attached to the base plate 2 following formation. For instance, a stiffener 2 can be welded (e.g., fusion welded with or without the use of a solder); adhesively bonded; attached by use of bolts, screws, staples, nails, etc.; or any combination thereof. In addition, an extension from a base plate 2 such as a stiffener 4 can extend from the base plate at any angle, and is not limited to a 90° stiffener as is illustrated in FIG. 2. A structure can include additional components in conjunction with a base plate 2 and a stiffener 4 such as ribs, joints, conduits, etc. as are known in the art. Disclosed methods can be utilized for detection of damage at any point of a structure including, without limitation, joints or other contact locations with other components, edges, corners, and across pristine spans of a base plate.

In one embodiment, a base plate 2 and/or a stiffener 4 can be formed of a polymeric laminate. A polymeric laminate can include a plurality of stacked layers attached to one another. At least one layer of the polymeric laminate can include a fiber reinforced polymeric composition. For instance, a polymeric laminate can include one or more layers of fiber reinforced thermoplastic tapes, tows, sheets, etc. and/or one or more layers of fiber reinforced thermoset tapes, tows, sheets, etc. Of course, a polymeric laminate is not limited to only layers of fiber reinforced polymeric compositions and the laminate can include layers of other materials, including, for example, a layer of polymeric composition that is not fiber reinforced, a non-polymeric layer, discontinuous layers, etc.

In one embodiment, a thermoplastic polymer of a fiber reinforced polymeric composition can be a high-performance polymer that can exhibit high mechanical properties such as stiffness, toughness, and low creep that make them valuable in the manufacture of structural products such as vehicle shell structures. High performance thermoplastic polymers as may be included in a thermoplastic composition can include, for example, polyarylene sulfides, polyaryletherketones, polyetherimides, polycarbonates, polyamides, liquid crystal polymers, etc., as well as copolymers and combinations of polymers.

A thermoset polymer of a fiber reinforced polymeric composition can include one or more thermoset polymers as are generally known in the art. For example, a fiber reinforced thermoset composition can include a matrix resin selected from one or more of an epoxide, a polyimide, a bis-maleimide, a polyphenol, a polyester, etc., or combinations thereof that, when fully cured, forms a crosslinked thermoset matrix.

The fibrous reinforcement of a composition may include one or more fiber types including, without limitation, polymer fibers, glass fibers, carbon fibers, metal fibers, natural fibers such as jute, bamboo, etc., basalt fibers, and so forth, or a combination of fiber types. For instance, the fibers may be chopped fibers, continuous fibers, or fiber rovings. For example, a composite prepreg as is known in the art can be used such as a continuous carbon fiber/epoxy resin, which is a common composite material used in polymeric laminates.

As illustrated in FIG. 2, a structure 20 can a stiffener 4 joined to a base plate 2 at a joint 14. Each segment 2, 4 can be formed of the same or different materials from one another, but can be in acoustic communication with one another (i.e., a Lamb wave is capable of transferring energy between adjacent laminate panels of the structure 20). Materials of formation for the components of a structure are not limited to polymeric laminates and can include metals, wood, and polymers as well as any composite material as is known in the art In the signal analysis, AGL incorporates local damage scattering coefficients obtained analytically at a damage site using the CMEP method (see, e.g., B. Poddar and V. Giurgiutiu, "Scattering of Lamb waves from a discontinuity: An improved analytical approach," *Wave Motion*, vol. 65, pp. 79-91, 2016; B. Poddar and V. Giurgiutiu, "Complex modes expansion with vector projection using power flow to simulate Lamb waves scattering from horizontal cracks and disbonds," *J. Acoust. Soc. Am.*, vol. 140, no. 3, pp. 2123-2133, September 2016). CMEP differs from previously known analysis methods such as LEM, BEM and SFEM. The basic principle of LEM is to express the unknown scattered fields by using the fundamental solutions for the pristine structure. In this regard, the LEM is a special case of the boundary element method (BEM). A classical BEM assumes Lamb wave mode expansion in terms of fundamental solutions for the unbounded elastic space while the LEM assumes point-source solutions for the semi-bounded layered structure. SFEM uses the finite element discretization to describe the damage geometry and then solves for the interacting Lamb waves kinematically, as common to all FEM approaches.

Briefly, CMEP considers the exact mixed boundary conditions at a damage location and applies a Galerkin-type solution utilizing as trial functions the exact Lamb waves generated in the pristine plate, i.e., performs a normal modes expansion in terms of the exact complex-domain Lamb waves in the pristine plate. Propagating, evanescent, and complex-wavenumber modes are all included in the expansion. The Galerkin-type minimization is done using a wave-power approach such that the velocity boundary conditions are multiplied by the conjugate of the relevant stress components of the trial functions whereas the stress boundary conditions are multiplied by the conjugate of the relevant velocity components of the trial functions. Beneficially, CMEP shows faster convergence then other methods and can calculate very efficiently the scatter coefficients for an analysis with accuracy.

Figure 3:
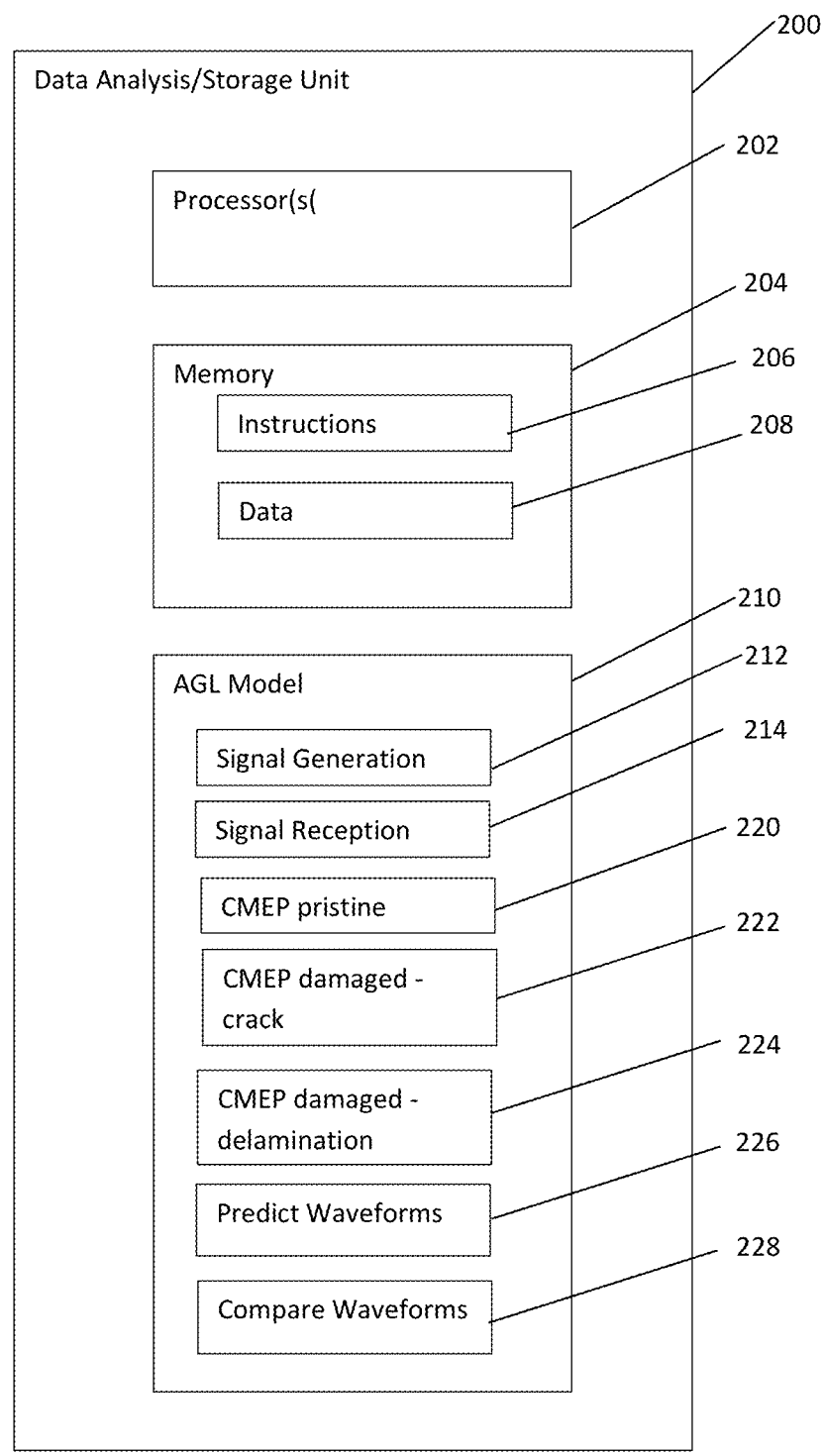
FIG. 3 illustrates an exemplary system for carrying out data manipulation and image identification methods as described herein.

In general, data processing, analysis, storage, etc. including signal generation, signal reception, CMEP, and signal comparison can be carried out by use of a computer system. FIG. 3 depicts an exemplary analysis unit 200 according to one embodiment of the present disclosure. Data analysis/storage unit 200 can be used in any SHM process. Moreover, methods as disclosed herein are not limited to use of only a single data analysis unit 200. For instance, in one embodiment, a first data analysis unit can be utilized in development of transmission and reflection coefficients according to CMEP, and a second, separate unit can be utilized in an SHM process that utilizes those coefficients in developing a predicted scattered wave field signal as well as in comparison of the predicted signal with a received signal in analysis of a structure for the presence and/or type of damage in the structure.

A data analysis/storage unit 200 can include one or more processors 202 and a memory 204. The processor(s) 202 can be any suitable processing device, such as a microprocessor, microcontroller, integrated circuit, or other suitable processing device, including a combination of discrete analog and/or digital logic circuitry (such as switches, amplifiers, integrators, comparators, flip-flops, AND gates, and the like) to perform control functionality.

The memory 204 can include any suitable computing system or media, including, but not limited to, non-transitory computer-readable media, RAM, ROM, hard drives, flash drives, or other memory devices. The memory 204 can store information accessible by processor(s) 202, including instructions 206 that can be executed by processor(s) 202. The instructions 206 can be any set of instructions that when executed by the processor(s) 202 cause the processor(s) 202 to provide desired functionality. Memory 204 can further store data 208. Data 208 can be any form of data, including reference data for use in an SHM protocol that can be stored for later transmission or utilization.

In one embodiment, a data analysis/storage unit 200 can include an AGL model 210 that can be utilized for signal analysis and damage recognition. A model can be used for signal generation 212 and signal reception 214 at PWAS transducers embedded in a structure, for instance signals as can be transmitted, propagated and received in a structure as illustrated in FIG. 2. Data collection for a system can include a hardware part, for instance that can utilize an automatic signal switch box, and a second part that can correspond to a control program for signal generation 212 and signal reception 214. In an exemplary method of operation, digital control signals are generated by the AGL model 210 and sent to a switch box through a parallel port associated with a data analysis/storage unit 200 by way of a standard parallel cable. It should be appreciated, however, by those of ordinary skill in the art that other signal transfer methodologies and apparatus could be used, including, but not limited to, serial ports, infrared ports, USB ports, FireWire (IEEE 1394) ports, and wireless connections including WiFi and Bluetooth® technology.

An AGL model 210 can include further components, examples of which can include, without limitation, multiple CMEP components that can generate predicted waveforms for a pristine (non-damaged) structure, for damaged structures having various types of damage (e.g., a crack, a delamination, a notch, a hole, etc.), for damage in various locations (e.g., at a joint, at an edge, along a plane, etc.) 220, 222, 223, etc. Once the scatter coefficients are determined using the CMEP method, then "global" portion of the AGL method can be utilized to propagate the scatter waves analytically away from the damage location and overlap them with the pristine propagation field to obtain predicted waveforms 226 that would be expected to be sensed by a receiver placed at a predetermined location. A model can also include a comparison component 228 in which the predicted waveforms can be compared to a test waveform in determination of the health of the structure being tested.

In the disclosed AGL modeling, a damage wave-power approach can be adopted such that the velocity boundary conditions are multiplied by the conjugate of the relevant stress components whereas the stress boundary conditions are multiplied by the conjugate of the relevant velocity components. Thickness dependent stress and displacement mode shapes can be expanded in terms of the propagating, evanescent, and complex-wavenumber modes. Considering evanescent Lamb wave mode provides a balanced power flow across a damaged/discontinuity boundary and as such, disclosed methods can provide for highly accurate prediction.

The mode conversion of guided waves occurs when a wave interacts with discontinues/damage in the structure. Understanding of the mode conversion behavior is of significant importance because it provides insight information of the damage/discontinuity. However, the study of the mode conversion effect usually requires two-dimensional analysis with an assumption on the through thickness displacement mode shape. In addition, designing a system for recognition of certain types of damage phenomenon or discontinuity (e.g., notch, delamination, stiffener etc.) can require consideration of the trapped wave mode.

In the disclosed methods, the scattered wave field from a damage/discontinuity is expanded in terms of complex Lamb wave modes with unknown scatter coefficients. These unknown coefficients are obtained from the boundary conditions using a vector projection utilizing the power expression. As such, disclosed methods can consider the reflected, transmitted as well as trapped wave modes in the interface condition and as such can provide improved results.

Beneficially, by use of CMEP methods to obtain the local scattering coefficients of Lamb wave modes at a site of damage/discontinuity, this local step can be performed in the frequency domain (harmonic analysis). Thus, a single simulation can be sufficient for a variety of incident tone burst signals with various center frequencies in that frequency domain. In addition, by performing the following global analytical step in the time domain for the tone burst signal with a particular center frequency, this step of the process can predict the time domain sensing signals by considering various distances between the actuator and damage, and between damage and sensors without affecting the computational time. Accordingly, disclosed methods can provide a route for highly efficient and accurate SHM for structures of complex geometries The present disclosure may be better understood with reference to the Examples set forth below.

EXAMPLE 1

Figure 4:
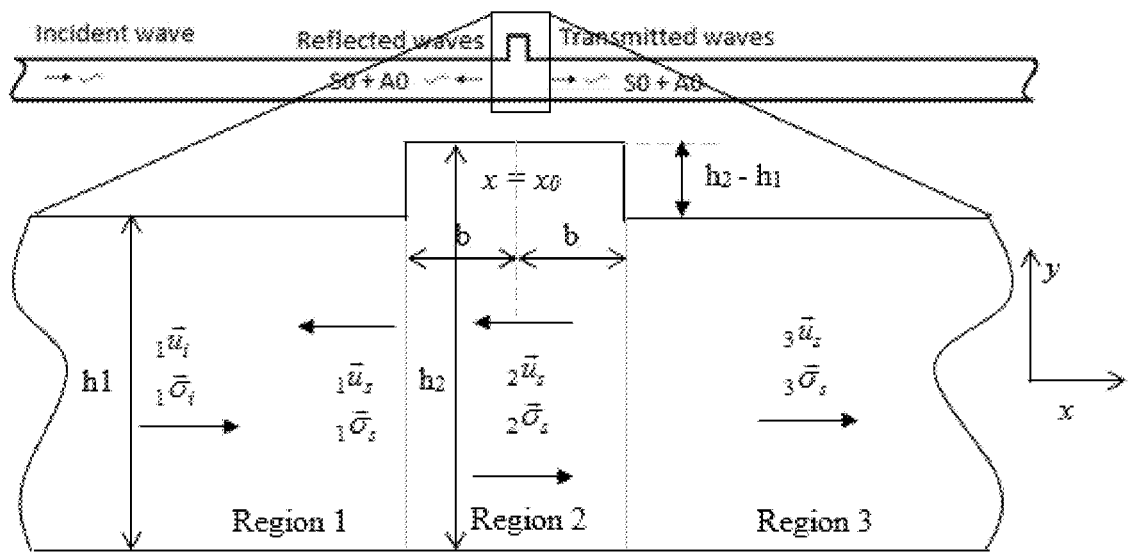
FIG. 4 schematically illustrates Lamb wave interaction with stiffener on a plate for an undamaged structure.

CMEP was carried out for two types of geometric discontinuities including: (1) a plate with a pristine stiffener and (2) a plate with a cracked stiffener. As shown in FIG. 4, the stiffener was located at $x=x_0$. The plate thickness was $h_1$. The height of the stiffener above the plate was $(h_2-h_1)$, and the width of the stiffener was $L=2b$. For the stiffener, height ratio can be defined as $R_h=(h_2-h_1)/h_1$, and width ratio as $R_w=2b/h_1$.

CMEP for Undamaged Plate and Stiffener

The incident wave field traveling in the +ve x direction is in Region 1. The reflected wave field is also in Region 1 and the transmitted wave field is in Region 3. The trapped wave field is inside the stiffener in Region 2. The incident and scattered wave fields satisfy the following wave equations:

$$_1\vec{u_i} = \sum_{j=1}^{\infty} {}_1\vec{u_j} e^{i(+\xi_j x - \omega t)} \qquad (1)$$

$$_1\vec{\sigma_i} = \sum_{j=1}^{\infty} {}_1\vec{\sigma_j} e^{i(+\xi_j x - \omega t)}$$

The scattered wave field is the summation of reflected wave field (Region 1), trapped wave field (Region 2) and transmitted wave field (Region 3). The scattered wave field can be written as, $$\vec{u_s} = \sum_{j=1}^{\infty} \left( {}_3 C_j^F {}_3\vec{u_j} e^{i(+\xi_j x - \omega t)} + {}_2 C_j^F {}_2\vec{u_j} e^{i(+\xi_j x - \omega t)} + \right. \qquad (2)$$

$$\left. {}_2 C_j^B {}_2\vec{u_j} e^{i(-\xi_j x - \omega t)} + {}_1 C_j^B {}_1\vec{u_j} e^{i(-\xi_j x - \omega t)} \right)$$

$$\vec{\sigma_s} = \sum_{j=1}^{\infty} \left( {}_3 C_j^F {}_3\vec{\sigma_j} e^{i(+\xi_j x - \omega t)} + {}_2 C_j^F {}_2\vec{\sigma_j} e^{i(+\xi_j x - \omega t)} + \right.$$

$$\left. {}_2 C_j^B {}_2\vec{\sigma_j} e^{i(-\xi_j x - \omega t)} + {}_1 C_j^B {}_1\vec{\sigma_j} e^{i(-\xi_j x - \omega t)} \right)$$

where, $\xi$ is the wavenumber and $\omega$ is the frequency. The subscript "i" stands for incident waves and "s" stands for scattered waves. The subscript "j" represents different wave modes. The coefficient ${}_sC_j^B$ is the unknown amplitude of the of backward propagating (reflected) Lamb waves in Region 1, whereas the coefficient ${}_sC_j^F$ is the unknown amplitude of forward propagating Lamb waves in Region 3. The coefficients ${}_2C_j^B$ and ${}_2C_j^F$ are the unknown amplitudes of the backward and forward propagating (trapped) Lamb waves respectively in Region 2.

The unknown amplitudes of these modes were determined by boundary conditions using a vector projection utilizing the power expression. These must satisfy the zero-stress boundary condition at the top and bottom of the plate, $$\sigma_{yy}\Big|_{\left(x<x_0-b; y=\pm\frac{h_1}{2}\right),\left(x>x_0+b; y=\pm\frac{h_1}{2}\right),\left(x_0+b>x>x_0-b; y=h_2-\frac{h_1}{2},-\frac{h_1}{2}\right)} = 0 \qquad (3)$$

$$\tau_{xy}\Big|_{\left(x<x_0-b; y=\pm\frac{h_1}{2}\right),\left(x>x_0+b; y=\pm\frac{h_1}{2}\right),\left(x_0+b>x>x_0-b; y=h_2-\frac{h_1}{2},-\frac{h_1}{2}\right)} = 0$$

The stress-displacement fields are:

$$\vec{u} = \begin{bmatrix} u_x \\ u_y \end{bmatrix}; \sigma = \begin{bmatrix} \sigma_{xx} & \tau_{xx} \\ \tau_{xy} & \sigma_{yy} \end{bmatrix}; \vec{\sigma} = \sigma \cdot \begin{bmatrix} 1 \\ 0 \end{bmatrix} \qquad (4)$$

Figure 5:
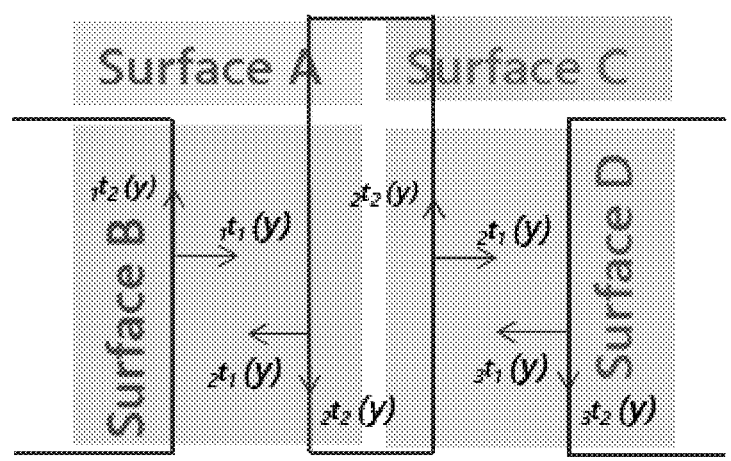
FIG. 5 schematically illustrates boundary conditions at stiffener interfaces of the undamaged structure of FIG. 4.

Therefore, for a vertical stiffener, boundary conditions are (FIG. 5)

$$_1\vec{u} = {_2\vec{u}}; \text{Surface } B \tag{5}$$

$$_2\vec{t} = \begin{cases} 0; & \text{Surface } A \\ -_1\vec{t}; & \text{Surface } B \end{cases}$$

$$_2\vec{\sigma} = \begin{cases} 0; & \text{Surface } A \\ -_1\vec{\sigma}; & \text{Surface } B \end{cases} \tag{6}$$

$$_2\vec{u} = {_3\vec{u}}; \text{Surface } D \tag{7}$$

$$_2\vec{t} = \begin{cases} 0; & \text{Surface } C \\ -_3\vec{t}; & \text{Surface } D \end{cases}$$

$$_2\vec{\sigma} = \begin{cases} 0; & \text{Surface } C \\ -_3\vec{\sigma}; & \text{Surface } D \end{cases} \tag{8}$$

Equations (5)-(8) represent the thickness dependent boundary conditions at the stiffener. CMEP formulation incorporates the time averaged power flow associated with the scattered wave fields through boundary condition. Thus, the stress boundary conditions are projected onto the conjugate displacement vector space ($\overline{u}_j = \text{conj}(\vec{u}_j)$), and the displacement boundary conditions are projected onto the conjugate stress vector space ($\overline{\sigma}_j = \text{conj}(\vec{\sigma}_j)$) of the complex Lamb wave modes. In Region 1, the displacement boundary conditions are projected onto the conjugate stress vector space of the complex Lamb wave modes. The final form of the projected boundary conditions is:

$$\int_{-h_1/2}^{h_1/2} (_1\vec{\sigma}_i + {_1\vec{\sigma}_s}) \cdot {_2\vec{u}_s} dy = \int_{h_1/2}^{h_2-h_1/2} {_2\vec{\sigma}_s} \cdot {_2\vec{u}_s} dy \tag{9}$$

$$\Rightarrow \sum_j {_2C_j^B}\langle(\overline{_2\vec{\sigma}_s} \cdot {_2\vec{u}_s})\rangle_{j,-h_1/2}^{h_2-h_1/2} + {_2C_j^F}\langle(\overline{_2\vec{\sigma}_s} \cdot {_2\vec{u}_s})\rangle_{j,-h_1/2}^{h_2-h_1/2} -$$

$$_1C_j^B\langle(\overline{_1\vec{\sigma}_s} \cdot {_2\vec{u}_s})\rangle_{j,-h_1/2}^{h_1/2} = \langle(\overline{_1\vec{\sigma}_i} \cdot {_2\vec{u}_s})\rangle_{j,-h_1/2}^{h_1/2}$$

where, $$\int_a^b P \cdot Q dy = \langle P, Q \rangle_a^b$$

represents the inner product. Equation (9) can be written in following algebraic equation form:

$$[A]_{j\times j}\{_2C_j^F\}_{j\times 1} + [B]_{j\times j}\{_2C_j^B\}_{j\times 1} - [D]_{j\times j}\{_1C_j^B\}_{j\times 1} + [0]_{j\times j}\{_3C_j^B\}_{j\times 1} = \{E\}_{j\times 1} \tag{10}$$

Similarly, in Region 2, the stress boundary conditions are projected onto the conjugate displacement vector space of the complex Lamb wave modes.

Similarly, in Region 3, the displacement boundary conditions are projected onto the conjugate stress vector space of the complex Lamb wave modes. After projecting, a total of 4j algebraic equations are obtained with 4j unknowns, i.e.:

$$\begin{bmatrix} A & B & -D & 0 \\ F & G & 0 & -H \\ J & K & -L & 0 \\ N & O & 0 & -P \end{bmatrix}_{4j\times 4j} \begin{Bmatrix} _2C_j^F \\ _2C_j^B \\ _1C_j^B \\ _3C_j^F \end{Bmatrix}_{4j\times 1} = \begin{Bmatrix} E \\ 0 \\ M \\ 0 \end{Bmatrix}_{4j\times 1} \tag{11}$$

$$\Rightarrow [Q]_{4j\times 4j}\{C\}_{4j\times 1} = \{R\}_{4j\times 1}$$

The coefficient matrices [A], [B], [D], [E], [F], [G], [H], [J], [K], [L], [M], [N], [O] and [P] are known matrices containing the vector projected boundary conditions. Eq. (11) can be solved for the unknown amplitudes of the reflected and transmitted Lamb wave modes as $$\{C\}_{4j\times 1} = [Q]_{4j\times 4j}^{-1}[R]_{4j\times 1} \tag{12}$$

CMEP for Cracked Stiffener

Figure 6:
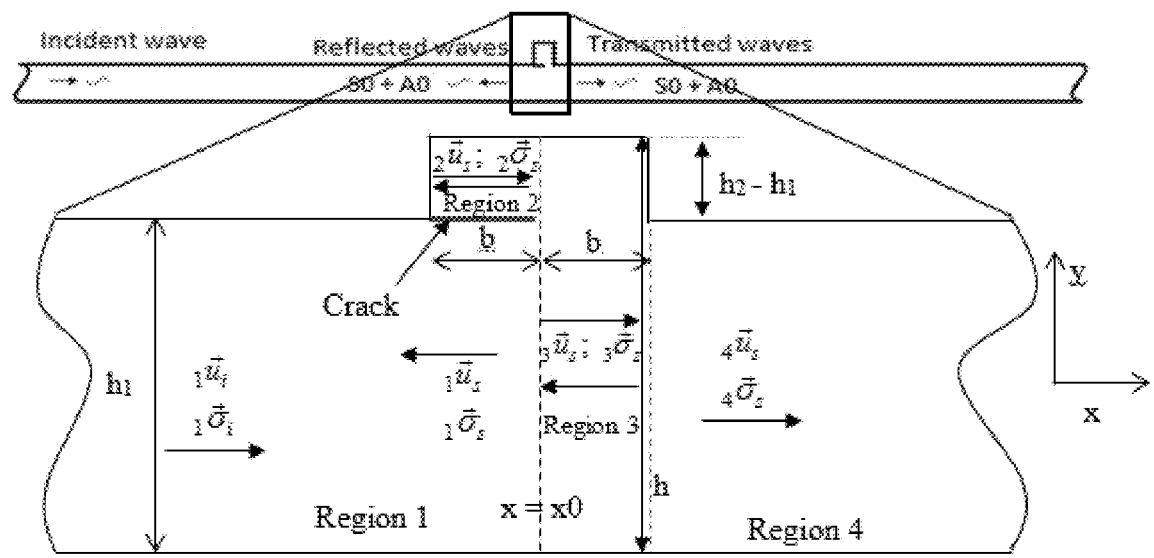
FIG. 6 schematically illustrates Lamb wave interaction with a cracked stiffener/plate joint in a structure.

FIG. 6 shows the cross-section of a plate with a cracked stiffener. The crack appears at the left end of the stiffener with length equal to plate thickness and crack length ratio is $R_C = L_C/h_1$. The incident wave field is represented by ($\Phi_0$, $H_0$), traveling in the +ve x direction in Region 1. The reflected wave field is in Region 1 and the transmitted wave field is in Region 4. The trapped wave field is inside the stiffener in Region 2 and Region 3.

The scattered wave field is the summation of reflected wave field (Region 1), trapped wave field (Region 2) and transmitted wave field (Region 3). The scattered wave field can be written as:

$$\vec{u}_s = \sum_{j=1}^{\infty} \begin{pmatrix} _4C_j^F\overrightarrow{_4u_j}e^{i(+\xi_j x - \omega t)} + {_3C_j^F}\overrightarrow{_3u_j}e^{i(+\xi_j x - \omega t)} + {_3C_j^B}\overrightarrow{_3u_j}e^{i(-\xi_j x - \omega t)} + {_2C_j^F}\overrightarrow{_2u_j}e^{i(+\xi_j x - \omega t)} + \\ _2C_j^B\overrightarrow{_2u_j}e^{i(-\xi_j x - \omega t)} + {_1C_j^B}\overrightarrow{_1u_j}e^{i(-\xi_j x - \omega t)} \end{pmatrix} \tag{13}$$

$$\vec{\sigma}_s = \sum_{j=1}^{\infty} \begin{pmatrix} _4C_j^F\overrightarrow{_4\sigma_j}e^{i(+\xi_j x - \omega t)} + {_3C_j^F}\overrightarrow{_3\sigma_j}e^{i(+\xi_j x - \omega t)} + {_3C_j^B}\overrightarrow{_3\sigma_j}e^{i(-\xi_j x - \omega t)} + {_2C_j^F}\overrightarrow{_2\sigma_j}e^{i(+\xi_j x - \omega t)} + \\ _2C_j^B\overrightarrow{_2\sigma_j}e^{i(-\xi_j x - \omega t)} + {_1C_j^B}\overrightarrow{_1\sigma_j}e^{i(-\xi_j x - \omega t)} \end{pmatrix}$$

The coefficient $_1C_j^B$ is the unknown amplitude of the of backward propagating (reflected) Lamb waves in Region 1, whereas the coefficient $_4C_j^F$ is the unknown amplitude of forward propagating Lamb waves in Region 4. The coefficients $_2C_j^B$, $_2C_j^F$, $_3C_j^B$, $_3C_j^F$ are the unknown amplitudes of the backward and forward propagating (trapped) Lamb waves respectively in Region 2 and Region 3.

The unknown amplitudes of these modes is determined by boundary conditions using a vector projection utilizing the power expression. These must satisfy the zero-stress boundary condition at the top and bottom of the plate:

$$\sigma_{yy}\Big|_{\left(x<x_0;y=\pm\frac{h_1}{2}\right),\left(x_0-b<x<x_0;y=h_2-\frac{h_1}{2},\frac{h_1}{2}\right),\left(x_0<x<x_0+b;y=h_2-\frac{h_1}{2},-\frac{h_1}{2}\right),\left(x>x_0+b;y=\pm\frac{h_1}{2}\right)} = 0 \qquad (14)$$

$$\tau_{xy}\Big|_{\left(x<x_0;y=\pm\frac{h_1}{2}\right),\left(x_0-b<x<x_0;y=h_2-\frac{h_1}{2},\frac{h_1}{2}\right),\left(x_0<x<x_0+b;y=h_2-\frac{h_1}{2},-\frac{h_1}{2}\right),\left(x>x_0+b;y=\pm\frac{h_1}{2}\right)} = 0$$

Figure 7:
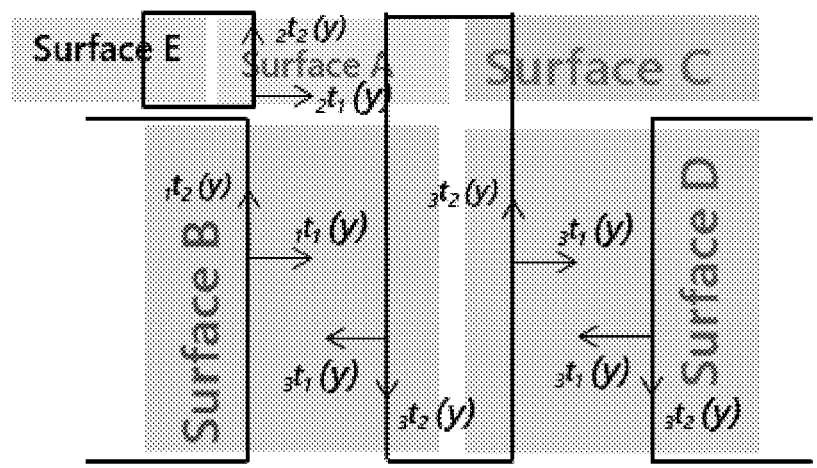
FIG. 7 schematically illustrates boundary conditions at stiffener interfaces of the damaged structure of FIG. 6.

Therefore, for a vertical stiffener, boundary conditions are (FIG. 7)

$$_1\vec{u} = {}_3\vec{u}; \text{ Surface } B \qquad (15)$$

$$_3\vec{t} = \begin{cases} -{}_2\vec{t}; & \text{Surface } A \\ -{}_1\vec{t}; & \text{Surface } B \end{cases} \qquad (16)$$

$$_3\vec{\sigma} = \begin{cases} -{}_2\vec{\sigma}; & \text{Surface } A \\ -{}_1\vec{\sigma}; & \text{Surface } B \end{cases}$$

$$_2\vec{u} = {}_3\vec{u}; \text{ Surface } A \qquad (17)$$

$$_2\vec{t} = \{ -{}_3\vec{t}; \text{ Surface } A$$

$$_2\vec{\sigma} = \{ -{}_3\vec{\sigma}; \text{ Surface } A \qquad (18)$$

$$_3\vec{u} = {}_4\vec{u}; \text{ Surface } D \qquad (19)$$

$$_3\vec{t} = \begin{cases} 0; & \text{Surface } C \\ -{}_4\vec{t}; & \text{Surface } D \end{cases}$$

$$_3\vec{\sigma} = \begin{cases} 0; & \text{Surface } C \\ -{}_4\vec{\sigma}; & \text{Surface } D \end{cases} \qquad (20)$$

$$_2\vec{\sigma} = \{ 0; \text{ Surface } E \qquad (21)$$

Thus, equations (17)-(21) represent the thickness dependent boundary conditions at the cracked stiffener.

In Regions 1 and 2, the displacement boundary conditions are projected onto the conjugate stress vector space of the complex Lamb wave modes. In Region 3, the stress boundary conditions are projected onto the conjugate displacement vector space of the complex Lamb wave modes. Similarly, in Region 4, the displacement boundary conditions are projected onto the conjugate stress vector space of the complex Lamb wave modes. Therefore:

$$\begin{bmatrix} -A & -B & -D & F & G & 0 \\ 0 & 0 & 0 & H & I & -J \\ 0 & 0 & 0 & K & L & 0 \\ -M & 0 & 0 & N & O & 0 \\ 0 & 0 & 0 & Q & R & -S \\ 0 & -U & -V & W & X & 0 \end{bmatrix}_{6j \times 6j} \begin{Bmatrix} {}_1C_j^B \\ {}_2C_j^F \\ {}_2C_j^B \\ {}_3C_j^F \\ {}_3C_j^B \\ {}_4C_j^F \end{Bmatrix}_{6j \times 1} = \begin{Bmatrix} E \\ 0 \\ 0 \\ P \\ 0 \\ 0 \end{Bmatrix}_{6j \times 1} \qquad (22)$$

$$\Rightarrow [\Upsilon]_{6j \times 6j} \{C\}_{6j \times 1} = \{\Lambda\}_{6j \times 1}$$

Equation (22) can be solved for the unknown amplitudes of the reflected and transmitted Lamb wave modes as $$\{C\}_{6N \times 1} = [\Upsilon]_{6N \times 6N}^{-1} [\Lambda]_{6N \times 1} \qquad (23)$$

Figure 8:
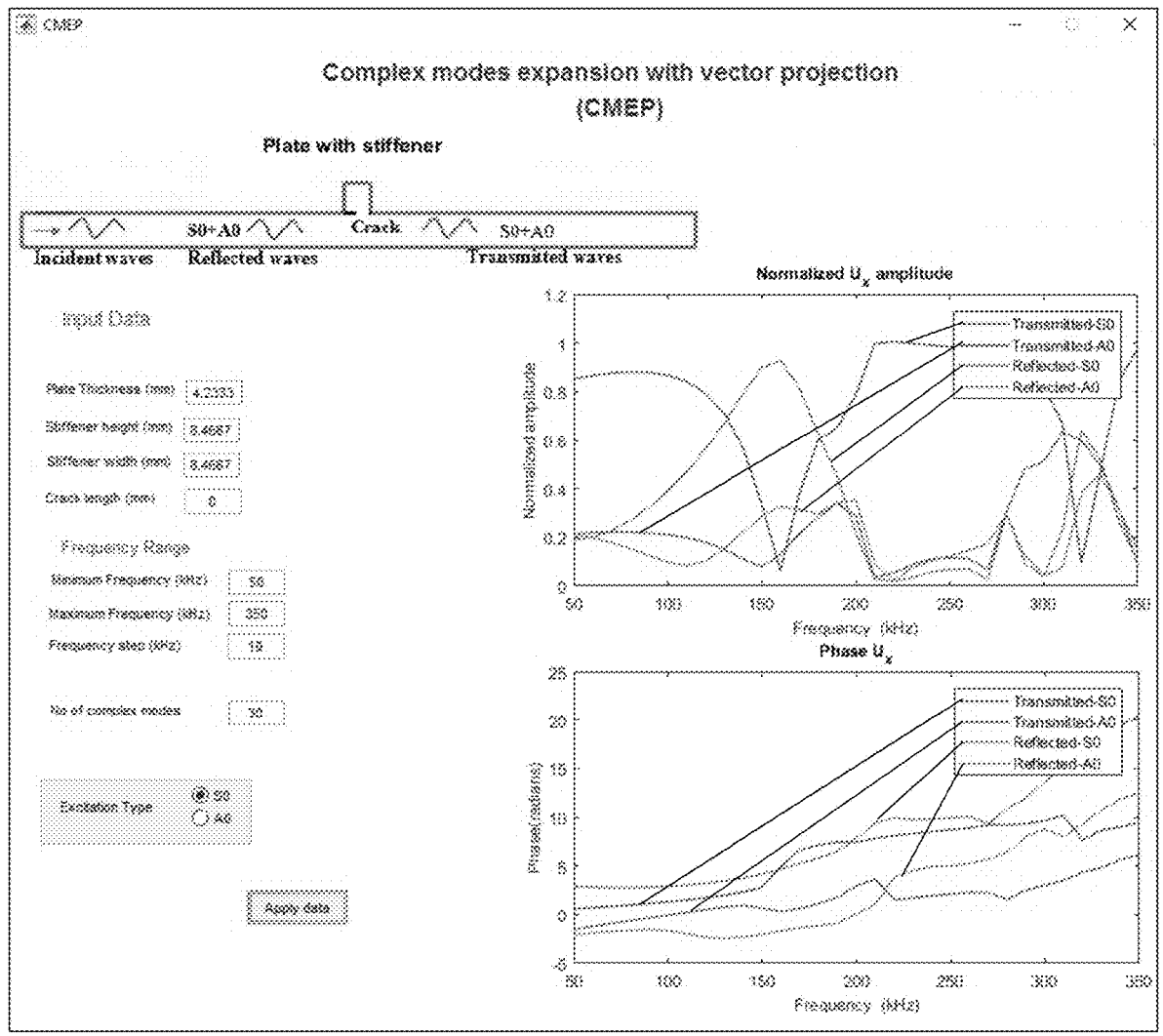
FIG. 8 illustrates a CMEP GUI used in predicting scattering coefficients in a stiffener plate.

A graphics user interphase (GUI) was prepared based on the analytical solution presented above. FIG. 8 shows the CMEP GUI for predicting scattering coefficients in a stiffener plate. This GUI worked for multiple different frequency ranges and various plate and stiffener geometries. GUI versatility improved the capability to solve Lamb wave scattering for different structure geometries and frequency ranges. In the illustrated GUI, crack length 0 mm implied the pristine stiffener case. Different crack length also could be assigned to this GUI. In the figure, the CMEP GUI is showing the scattering coefficients for the pristine case. The software also populated a data base showing scattering coefficients for each of the modes at different frequency. The database could also be used for predicting Lamb wave in the Global solution (examples of which are described further below). The CMEP GUI predicted the scatter coefficients within 120 sec for all of the cases. In comparison, FEM would require at least 15 hours. Thus, CMEP was shown to be a computationally efficient method for predicting the scattering of Lamb waves.

EXAMPLE 2

Figure 9:
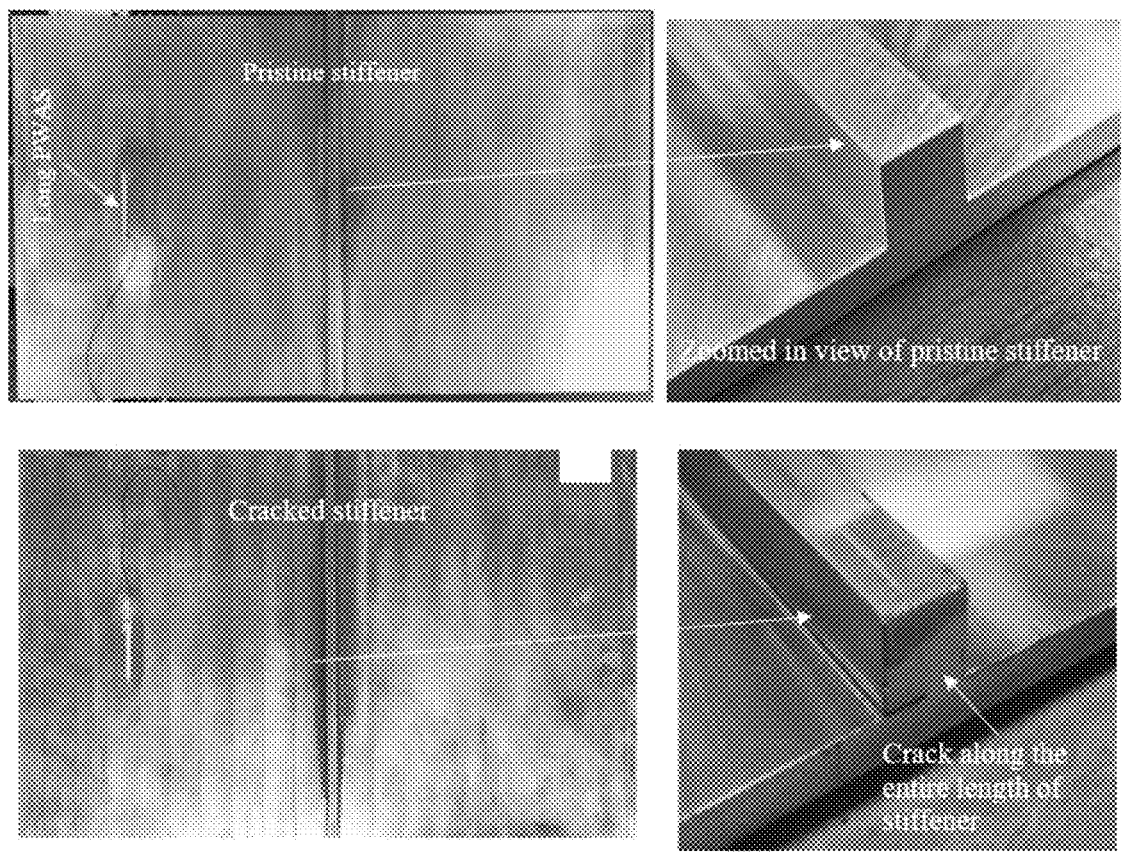
FIG. 9 illustrates aluminum plates utilized in examples described herein including a pristine stiffener (above) and a cracked stiffener (below).
Figure 10:
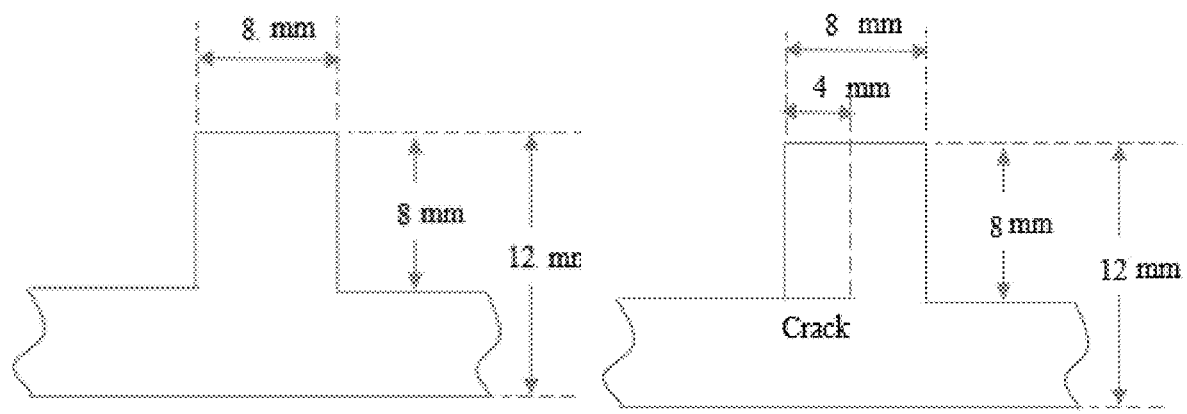
FIG. 10 schematically illustrates the geometry and dimensions of the pristine stiffener (left) and the cracked stiffener (right) illustrated in FIG. 9.
Figure 11:
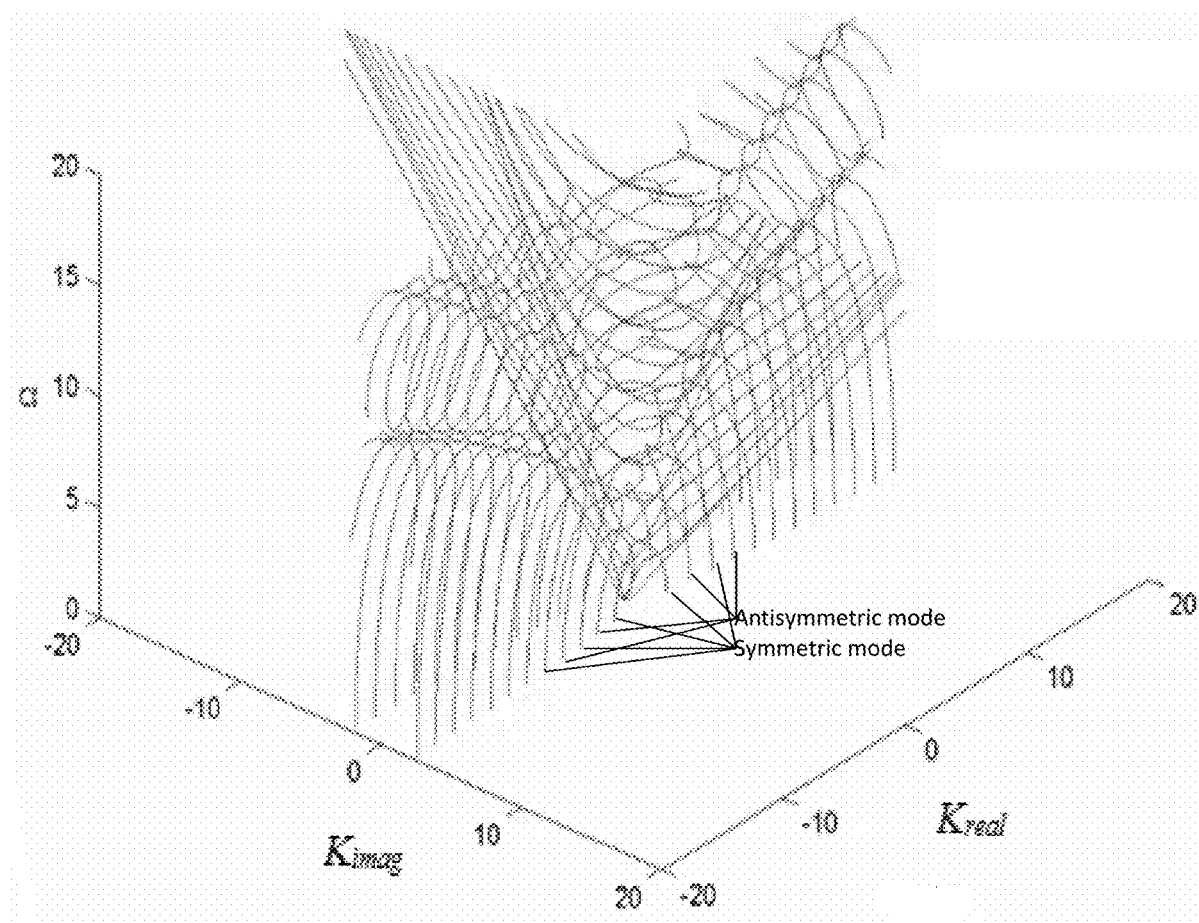
FIG. 11 is a graphic representation of the complex roots of Rayleigh-Lamb equations for v=0.33.

An aluminum plate with a vertical stiffener was examined for verification of CMEP theoretical developments described above. FIG. 9 illustrates pristine (above) and cracked (below) plates used in the example and FIG. 10 is a schematic showing the geometry and dimensions of the pristine (left) and cracked (right) plates. FIG. 9 (top) shows the aluminum plate with pristine stiffener, and FIG. 9 (bottom) shows the aluminum plate with a cracked stiffener. FIG. 10 shows the dimensions of the pristine stiffener (left) and the dimensions of the cracked stiffener (right). The width of the crack was the half of the stiffener width. The position of the crack in the thickness direction was 4 mm from the bottom of the plate. Table 1, below, presents the material properties for the aluminum, and Table 2 represents the dimensions of the plates. With respect to plate thickness $h_1$, the stiffener had a height ratio of $R_h=(h_2-h_1)/h_1=2$, width ratio $R_w=2b/h_1=2$ and crack ratio $R_c=L_c/h_1=1$. The CMEP approach requires complex modes of Lamb waves for the modal expansion. Therefore, to utilize the CMEP approach, the first step was to determine the complex roots of Rayleigh-Lamb equations. FIG. 11 shows all the complex roots of Rayleigh-Lamb equations.

TABLE 1

| Elastic modulus E(GPa) | Density $\rho$ (kg/m³) | Poisson ratio $\nu$ |
|---|---|---|
| 70.4 | 2780 | 0.33 |

TABLE 1

| Stiffener types | Material | Plate thickness $h_1$ (mm) | Stiffener height $h_2 - h_1$ (mm) | Stiffener width 2b (mm) | Crack length $L_c$ (mm) |
|---|---|---|---|---|---|
| Pristine stiffener | Aluminum | 4 | 8 | 8 | 0 |
| Cracked stiffener | Aluminum | 4 | 8 | 8 | 4 |

Figure 12:
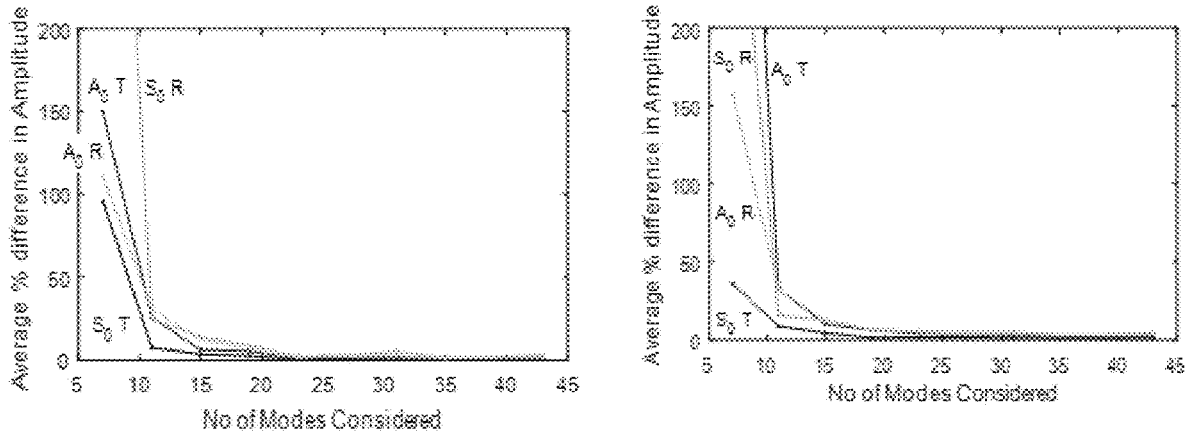
FIG. 12 illustrates convergence of amplitudes ($u_x$) scattered Lamb wave modes of a pristine stiffener (left) and a cracked stiffener (right) for S0 mode incident over a wide frequency range of 50 kHz to 350 kHz.

For theoretical simulations incident S0 Lamb wave mode was considered as an incident wave. For 4 mm thick aluminum plate, higher Lamb wave mode A1 appeared around 390 kHz. At higher frequencies, when more modes are present, the slope of dispersion curve tends to flatten out with the consequence of a shorter wave pulse carrying less information of the damage. Also, due to the presence of multi-Lamb wave modes at high frequency, it is difficult to distinguish the individual mode from the received signal. At very low frequencies, the dispersion curves have steep slopes and thus are very sensitive to small variations in frequency making it difficult to predict the time-of-flight. Moreover, at low frequency Lamb wave contains higher wavelength, which may not be sensitive to damage detection. Recommended by practical application, frequency range from 50 kHz to 350 kHz is considered for excitation. FIG. 12 represents the CMEP convergence study results. Convergence study provided the maximum number of complex roots of Rayleigh-Lamb equation needed to calculate S0 and A0 modes scattered from a geometric discontinuity with considerable accuracy. At left in FIG. 12 is shown the convergence study for the pristine stiffener and the graph on the right shows the convergence study for a cracked stiffener. Convergence studies inferred that approximately 35 modes were required for convergence with less than 3% error.

Figure 13:
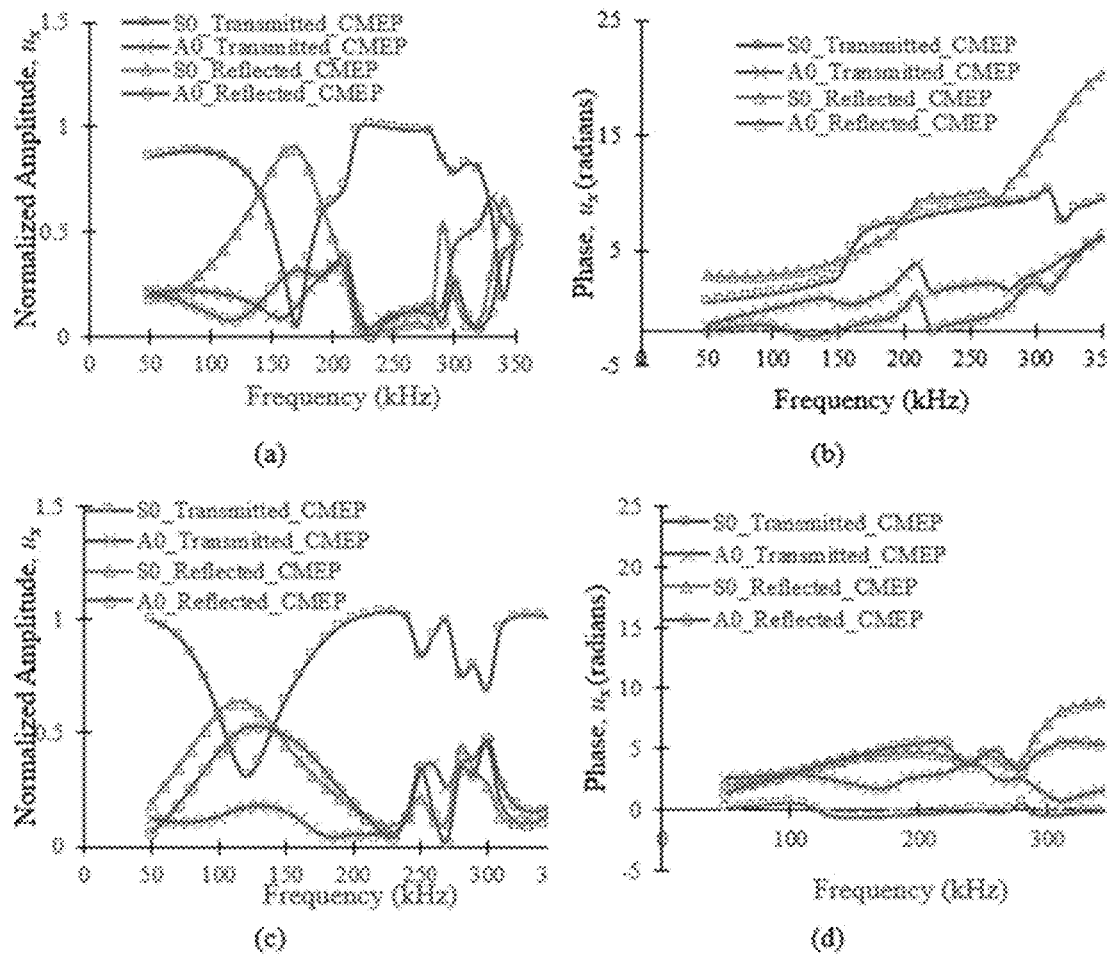
FIG. 13 presents normalized amplitude (a) and phase (b) of $u_x$ displacement for a pristine stiffener and normalized amplitude (c) and phase (d) of $u_x$ displacement for a cracked stiffener of scattered wave modes for incident S0 mode.

FIG. 13 represents the S0, and A0 scattered wave amplitudes (a) and phase angle (b) for pristine stiffener on an aluminum plate and the S0 and A0 scattered wave amplitudes (c) and phase angle (d) for a cracked stiffener on the aluminum plate. The peak of scattering coefficients changed due to the presence of crack as it can be interpreted from FIGS. 13(*a*) and (*c*). As shown, the minimum peak of S0 transmitted shifted from 160 kHz to 120 kHz due to the presence of a crack. The amplitude of S0 transmitted mode at the dip increased due to the energy redistribution because of the crack. The changes for A0 transmitted, S0 reflected and A0 reflected modes due to crack can also be observed from FIGS. 13(*a*) and (*c*). Not only amplitude changed, but phase change also occurred due to the influence of the crack (FIG. 13(*b*), (*d*)).

Therefore, the frequency spectrum of the scattered Lamb wave modes (e.g., the changes in the amplitude and phase with frequency of scattered Lamb wave modes due to the presence of crack) can be utilized for predicting the presence of a crack in the stiffener. Scatter coefficient plots can predict the appropriate frequency range of excitation to excite Lamb waves to get the damage information from the time domain signal. From FIG. 13 at (a) and (c), for this particular material and geometry, 120 kHz to 160 kHz would be an adequate choice of frequency for both S0 and A0 incident wave to detect the crack.

Global Analytical Solution

Figure 14:
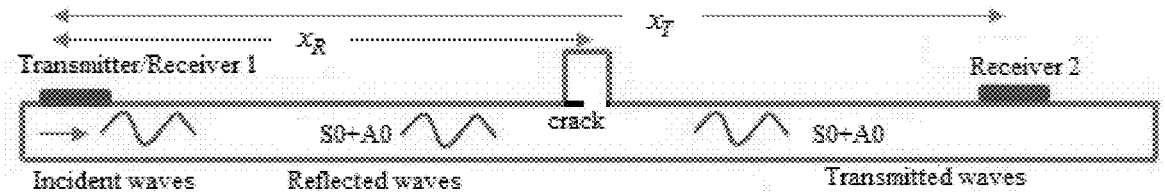
FIG. 14 schematically illustrates exemplary transmitter and sensor locations for predicting Lamb waves scatter due to discontinuity of a structure.
Figure 15:
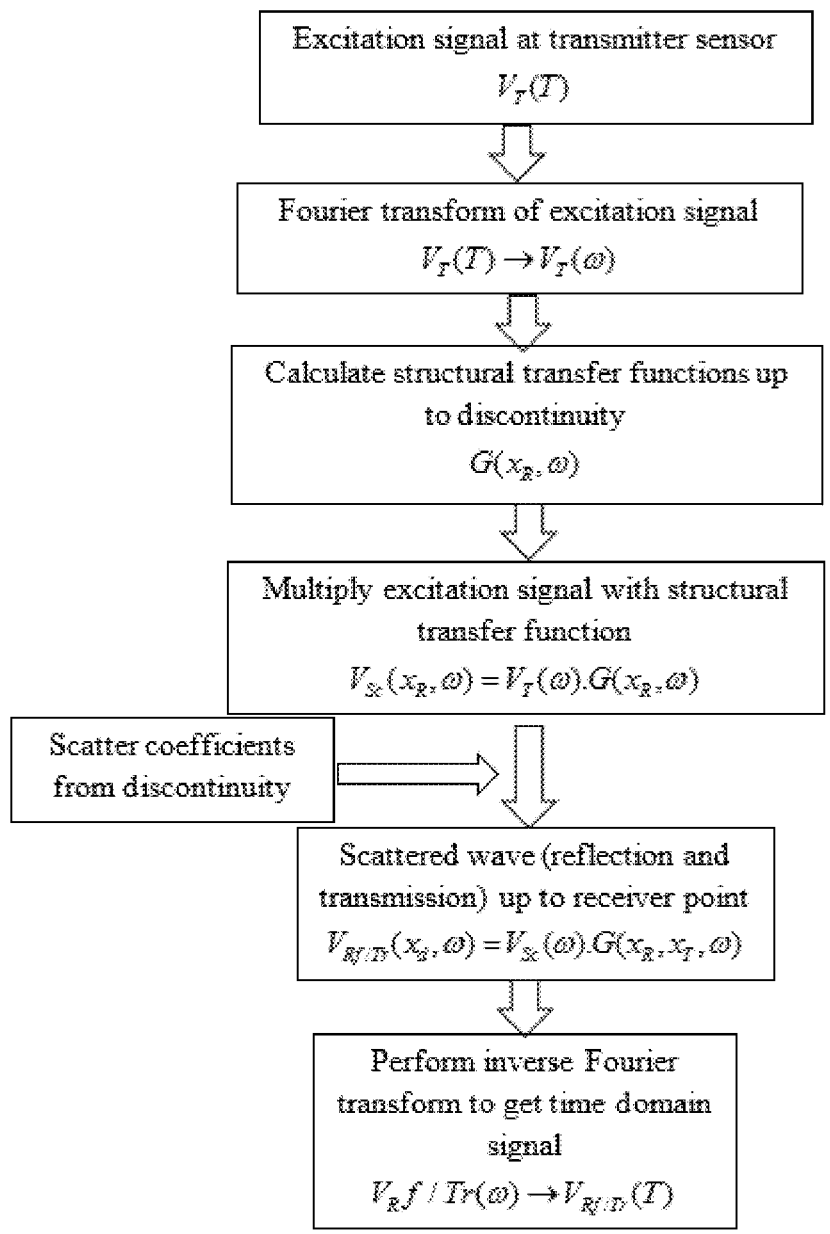
FIG. 15 presents a flowchart of steps involved in one embodiment of a global-local analytical approach as described herein.

Following determination of the scattering coefficients, these scattering coefficients were then fed into the global analytical method. A schematic of the AGL analysis is shown in FIG. 14. The algorithm of the steps of the global analytical solution to incorporate the local scattering coefficients is presented by using a flowchart as shown in FIG. 15.

The global analytical solution performed the wave generation by a transmitter sensor, wave propagation through the structure, incorporation of the scattering coefficients in particular to damage (pristine stiffener and cracked stiffener, in this case), and detection by a receiver sensor. The whole process utilized the structural transfer function, the time domain signal generation, Fast Fourier transform (FFT) and inverse FFT. Therefore, the combination of global and local CMEP method provided a complete analytical solution for Lamb wave scattering and propagation. The following steps were followed for a global analytical solution.

First, a time-domain excitation signal from a PWAS transmitter was considered. For tone burst excitation signal the following equation can be used $$V_T(t) = V_0(1 - \cos(\omega_c t))\sin(\omega_c t) \tag{24}$$

Here, $V_0$ is the amplitude, $\omega_c$ is the center frequency and t is the time.

Perform Fourier transform of the time-domain excitation signal was then carried out to obtain the frequency domain excitation signal The frequency-domain structural transfer function up to the damage location was calculated:

$$G(x_R, \omega) = \varepsilon_x(x_R, t) = -i\frac{a\tau_0}{\mu}\left\{\sum_{\xi^S}(\sin\xi^S a)\frac{N_S(\xi^S)}{D'_S(\xi^S)}e^{-i(\xi^S x_R - \omega t)} + \sum_{\xi^A}(\sin\xi^A a)\frac{N_A(\xi^A)}{D'_A(\xi^A)}e^{-i(\xi^A x_R - \omega t)}\right\} \tag{25}$$

where ξ is the frequency dependent wave number of each Lamb wave mode and the superscripts S and A refer to symmetric and antisymmetric Lamb wave modes $$N_S(\xi) = \xi\beta(\xi^2 + \beta^2)\cos\alpha d\cos\beta d; \tag{26}$$
$$D_S = (\xi^2 - \beta^2)\cos\alpha d\sin\beta d + 4\xi^2\alpha\beta\sin\alpha d\cos\beta d$$
$$N_A(\xi) = -\xi\beta(\xi^2 + \beta^2)\sin\alpha d\sin\beta d;$$
$$D_A = (\xi^2 - \beta^2)\sin\alpha d\cos\beta d + 4\xi^2\alpha\beta\cos\alpha d\sin\beta d$$
$$\alpha^2 = \frac{\omega^2}{c_p^2} - \xi^2; \beta^2 = \frac{\omega^2}{c_s^2} - \xi^2; c_p = \sqrt{\frac{\lambda + 2\mu}{\rho}}; c_s = \sqrt{\frac{\mu}{\rho}};$$
$$\kappa_{PWAS} = -i\frac{a\tau_0}{\mu}$$

α is the half-length of PWAS size; d is plate half thickness. The modal participation functions S(ω) and A(ω) determine the amplitudes of the S0 and A0 wave modes. The terms $\sin(\xi^S\alpha)$ and $\sin(\xi^A\alpha)$ control the tuning between the PWAS transducer and the Lamb waves. λ and μ are Lame's constants of the structural material; ρ is the material density. The wavenumber ξ of a specific mode for certain frequency ω is calculated from Rayleigh-Lamb equation.

The structural transfer function was then multiplied by the frequency-domain excitation signal to obtain the frequency domain signal up to the discontinuity, i.e., $$\tilde{V}_{Sc}(x_R, \omega) = G(x_R, \omega) \cdot \tilde{V}_T(\omega) \tag{27}$$

At this stage, frequency-dependent scattering coefficient (transmission, reflection and mode conversion) from discontinuity were inserted in the wave signal. Scattering coefficients were determined by using local CMEP approach as described above. Table 3, below, provides the scattering coefficients inserted into the wave signal. Scatter coefficients $SR_{S0}$ and $\phi^{SR_{S0}}$ are the amplitude and phase of the reflected $S_0$ mode for incident $S_0$ mode respectively. The same terminology will be applied for other scatter coefficients.

TABLE 3

| Incident wave | Direct scattered wave | | Mode Conversion | |
|---|---|---|---|---|
| mode | Reflection | Transmission | Reflection | Transmission |
| S0 | $SR_{S0}$, $\phi^{SRS0}$ | $ST_{S0}$, $\phi^{STS0}$ | $AR_{S0}$, $\phi^{ARS0}$ | $AT_{S0}$, $\phi^{ATS0}$ |
| A0 | $AR_{A0}$, $\phi^{ARA0}$ | $AT_{A0}$, $\phi^{ATA0}$ | $SR_{A0}$, $\phi^{SRA0}$ | $ST_{A0}$, $\phi^{STA0}$ |

The guided waves from the new wave sources (at damage location) propagate through the structure and arrive at the receiver location. For reflected wave:

$$\tilde{V}_{Rf}(x_R, \omega) = \left[SR_{S0}e^{-i\varphi^{SR_{S0}}} \cdot \tilde{V}_{Sc}^{S}(x_R, \omega) + \right. \quad (28)$$

$$SR_{A0}e^{-i\varphi^{SR_{A0}}} \cdot \tilde{V}_{Sc}^{A}(x_R, \omega)\right]e^{-i\xi^{S}(-x_R)} + \left[AR_{S0}e^{-i\varphi^{AR_{S0}}} \cdot \right.$$

$$\left. \tilde{V}_{Sc}^{A}(x_R, \omega) + AR_{A0}e^{-i\varphi^{AR_{A0}}} \cdot \tilde{V}_{Sc}^{S}(x_R, \omega)\right]e^{-i\xi^{A}(-x_R)}$$

For transmitted wave:

$$\tilde{V}_{Tr}(x_R, x_T, \omega) = \left[ST_{S0}e^{-i\varphi^{ST_{S0}}} \cdot \tilde{V}_{Sc}^{S}(x_R, \omega) + \right. \quad (29)$$

$$ST_{A0}e^{-i\varphi^{ST_{A0}}} \cdot \tilde{V}_{Sc}^{A}(x_R, \omega)\right]e^{-i\xi^{S}(x_T - x_R)} + \left[AT_{S0}e^{-i\varphi^{AT_{S0}}} \cdot \right.$$

$$\left. \tilde{V}_{Sc}^{A}(x_R, \omega) + AT_{A0}e^{-i\varphi^{AT_{A0}}} \cdot \tilde{V}_{Sc}^{S}(x_R, \omega)\right]e^{-i\xi^{A}(x_T - x_R)}$$

Inverse Fourier transform was then performed to obtain the time-domain receiver signal.

$$V_{Rf/Tr}(x_t, x_r, t) = IFFT\{\tilde{V}_{Rf/Tr}(x_t, x_r, \omega)\} \quad (30)$$

EXAMPLE 3

Figure 16:
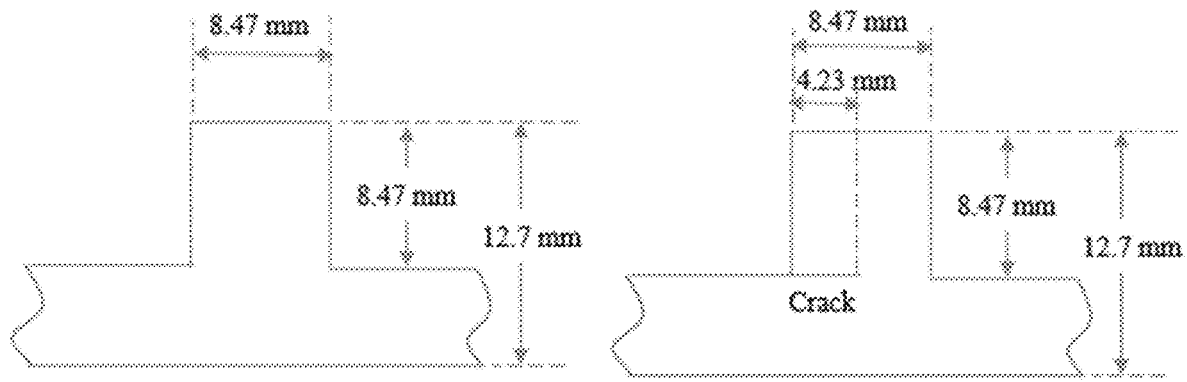
FIG. 16 presents the geometry and dimensions of a pristine stiffener (left) and a cracked stiffener (right) examined in an example described herein.

A structure including a vertical stiffener in an aluminum plate as schematically illustrated in FIG. 16 was examined. The structure had the following characteristics: E=70 GPa, $\rho$=2780 kg/m$^3$, v=0.33, plate thickness $h_1$=4.23 mm, the height of the stiffener, $h_2-h_1$=8.47 mm, stiffener width, 2b=8.47 mm. Therefore, the thickness in Region 2, $h_2$=12.7 mm. Consequently, the stiffener height ratio and width ratio were $R_h=h_2-h_1/h_1$=2 and $R_w$=2b/$h_1$=2, respectively. For the cracked stiffener (right), the crack length was $L_c$=4.23 mm. The crack ratio was $R_c=L_c/h_1$=1 with respect to plate thickness.

A0 Lamb wave mode was considered as incident wave since laser Doppler vibrometer (LDV) experimental measurement had been performed and LDV provides better accuracy in out-of-plane velocity of A0 mode. A frequency range of 50 kHz to 350 kHz was chosen in this study to avoid higher propagating mode. Convergence studies were performed to determine the total number of complex modes required for the convergence of both A0 and scattered S0 Lamb wave mode. It was found that consideration of 35 modes in the expansion could ensure a convergence within 2% error.

Figure 17:
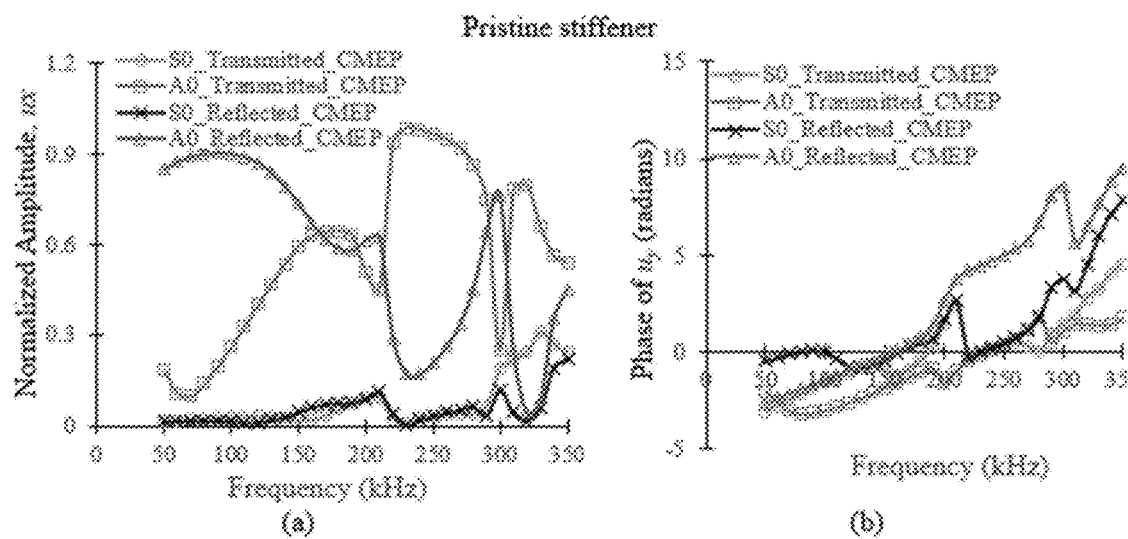
FIG. 17 presents the normalized amplitude (a) and phase (b) of $u_x$ displacement for pristine stiffener and normalized amplitude (c) and phase (d) of $u_x$ displacement for cracked stiffener of scattered wave modes for incident A0 mode.
Figure 17:
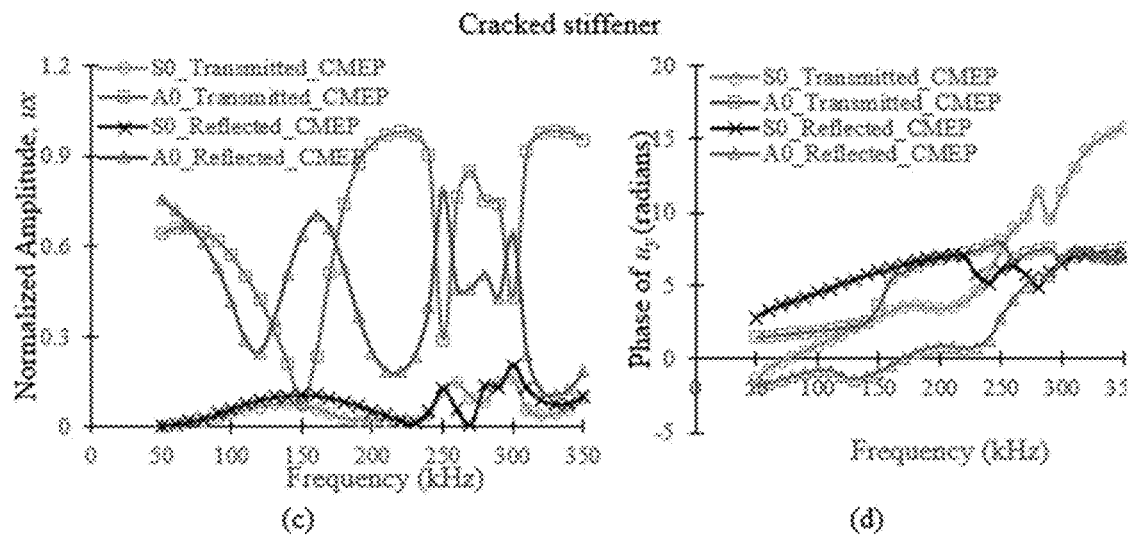

FIG. 17 shows the scattered wave (S0 and A0 modes) amplitudes and phase angle for incident A0 modes for both pristine stiffener and cracked stiffener on the plate. By comparing FIGS. 17(a) and (c), it can be seen that the dip in the frequency spectra of scattered wave modes changes due to the presence of a crack. For example, the dip in the frequency spectra for reflected A0 mode appears at ≈190 kHz for the pristine stiffener and ≈150 kHz for the cracked stiffener. The dips in the spectra are caused by destructive interference between various waves in the structure.

The presence of the crack modified the dip in the frequency spectra, and the change depends on the size of the crack. The amplitude of the A0 transmitted out-of-plane displacement at dip frequency decreases due to the presence of a crack in the stiffener. A similar comparison can be made for the other wave modes S0 transmitted, S0 reflect, and A0 reflected. The phase of the in-plane displacement also changed due to the presence of the crack (FIGS. 17(b) and (d)). Therefore, by comparing the scattered wave modes, there is a clear indication that the crack modified the frequency response of the scattered wave amplitudes and phases. Moreover, it gives insight information to choose a suitable frequency range to excite the Lamb wave to get the damage information from the time domain signal. For this particular case, the frequency at 150 kHz would be a good choice for A0 incident wave to detect the crack.

An experimental validation of the global-local analytical results was carried out. The analysis of the scattered Lamb wave was performed to detect the crack in the stiffener on the plate.

Figure 18:
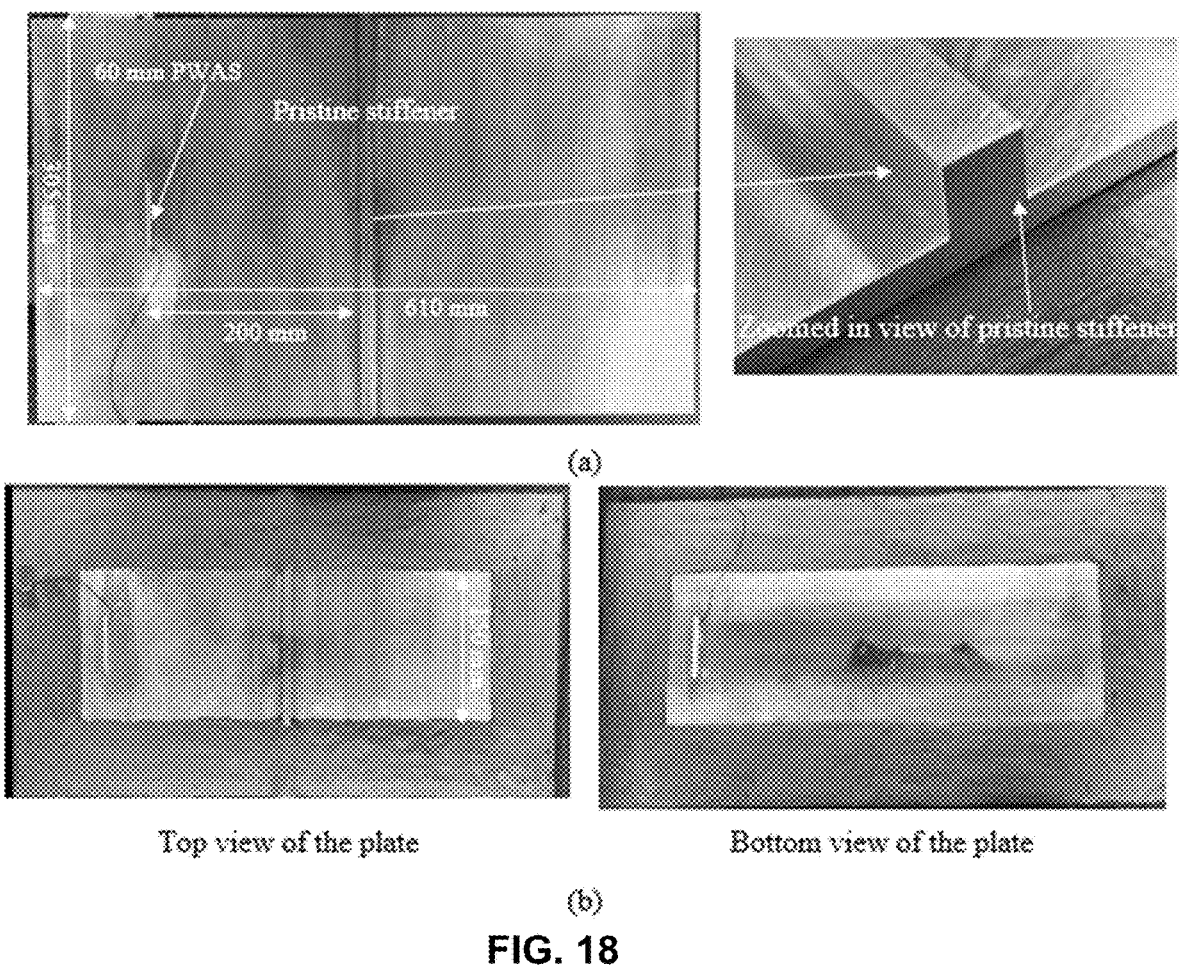
FIG. 18 illustrates a top and perspective view of an aluminum plate with pristine stiffener (a) and a top and bottom view of the plate (b) after applying a wave-absorbing clay.
Figure 19:
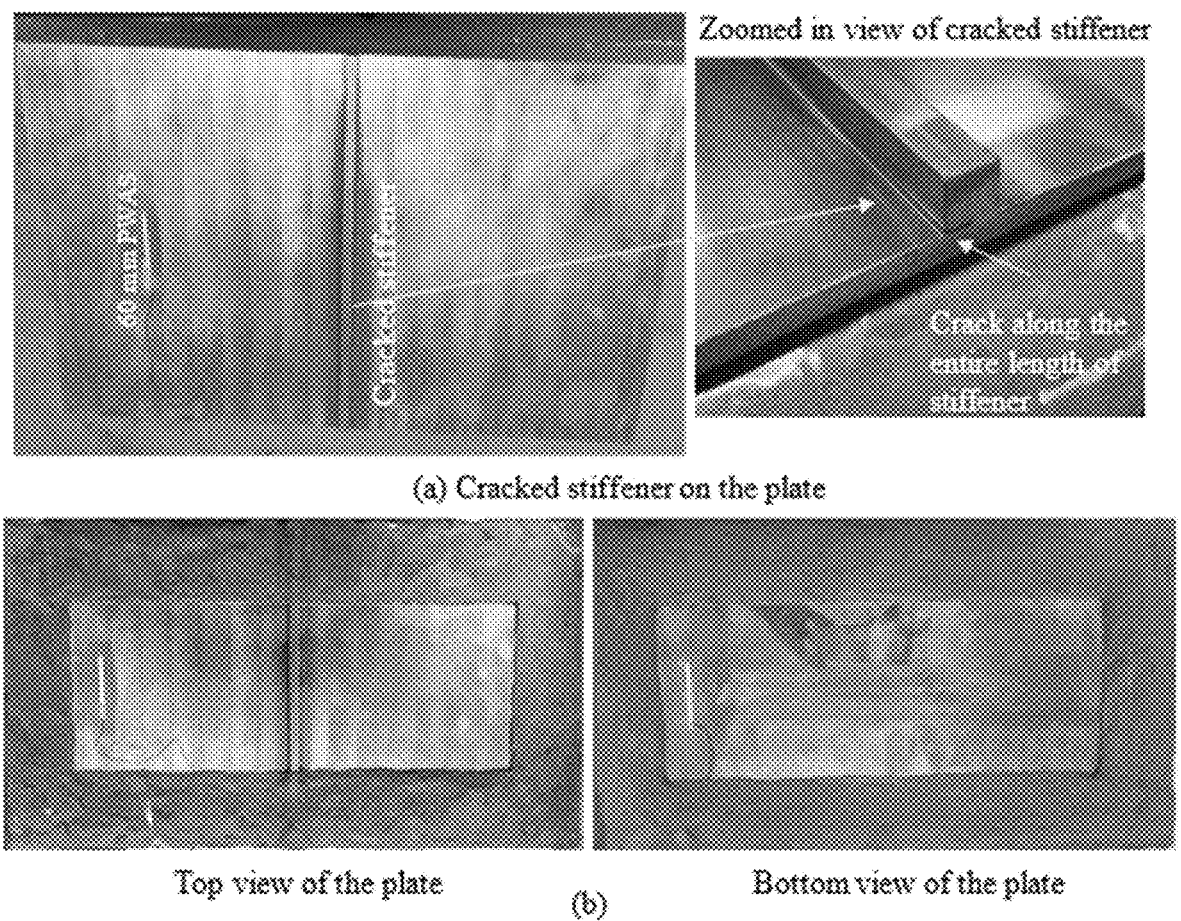
FIG. 19 illustrates an aluminum plate with a cracked stiffener with 60-mm long PWAS strips bonded on top and bottom of the plate at (a) is shown a top view and a perspective view of the crack along the entire length of the stiffener, and at (b) is shown a top and bottom view of the plate after applying wave-absorbing clay boundary.

Two aluminum plates were manufactured for conducting the experiments: a plate with a pristine stiffener as schematically illustrated in FIG. 16, left (FIG. 18), and a plate with a cracked stiffener as schematically illustrate in FIG. 16, right (FIG. 19) with same geometric dimension. Electrical discharge machining (EDM) method was used to create a crack along the entire length of the stiffener (FIG. 19(a)). Two 60 mm×5 mm×0.2 mm piezoelectric wafer active sensors (PWAS) were bonded in a straight line on top and bottom surfaces of the plates to create a line source.

In both plates, the PWAS transducers were bonded 200 mm away from the stiffener. Two PWAS were excited simultaneously with a 180-degree phase difference to generate A0 Lamb waves, selectively. A 3.5 count tone burst at 150 kHz was applied as excitation signal by using a Tektronics AFG3052C dual channel function generator.

Figure 20:
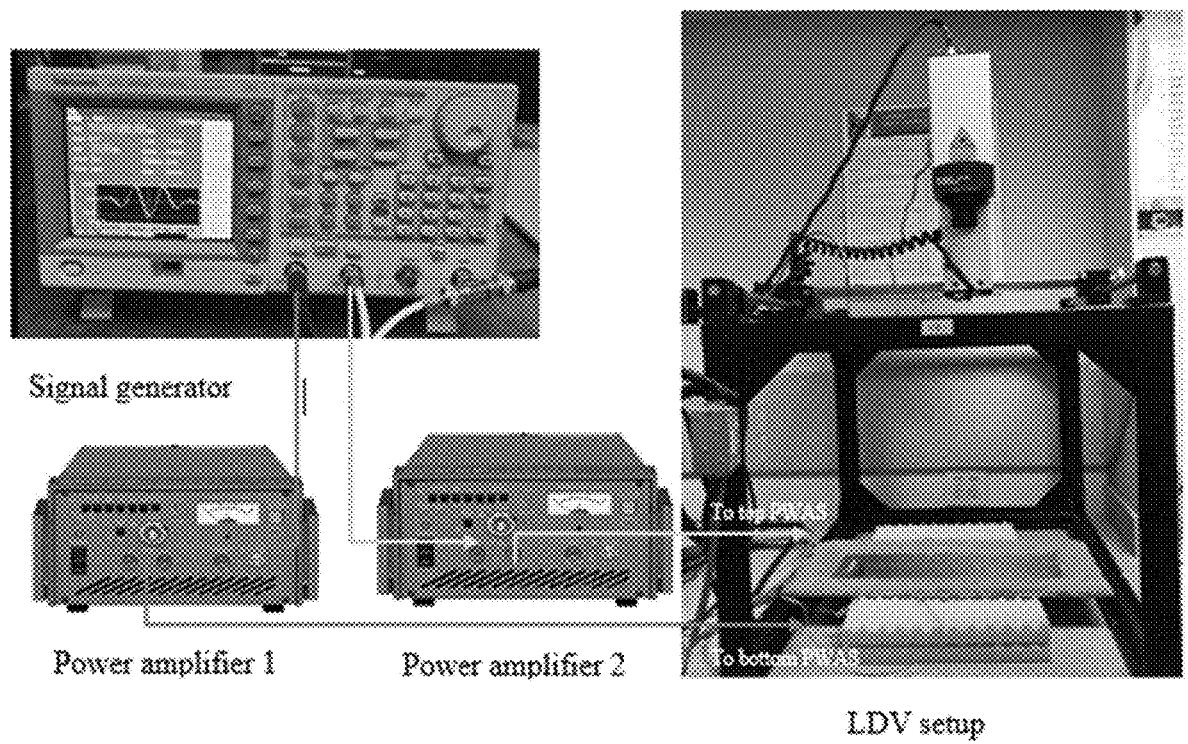
FIG. 20 illustrates an experimental setup for LDV scanning to measure the out-of-plane velocity of a scattered wave field.
Figure 21:
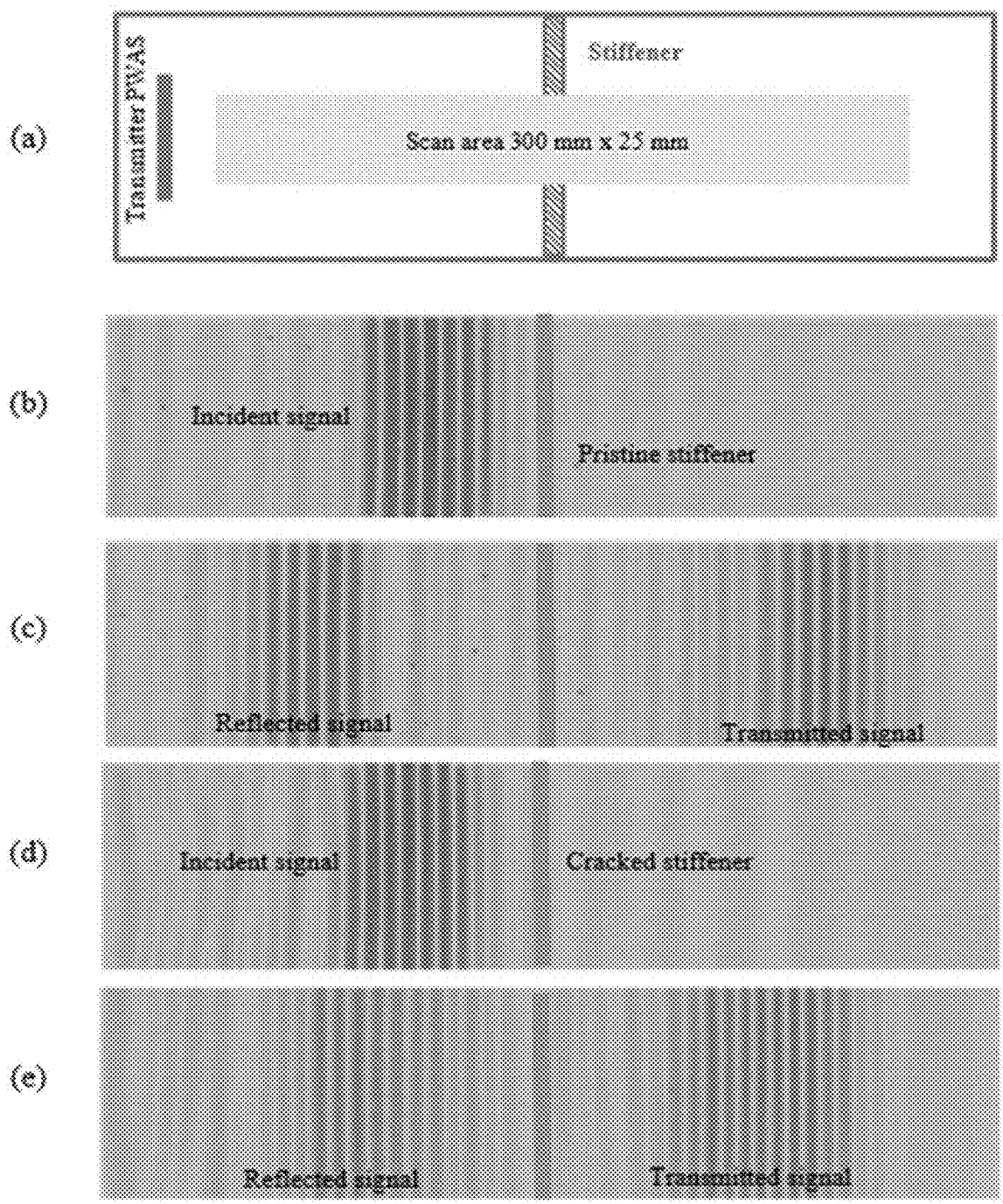
FIG. 21 illustrates an experimentally measured scattered wave field.

The wave-absorbing clay boundary around the plate was used to avoid reflection from the plate edges. The wave fields were measured using scanning LDV. Power amplifiers were used to improve the signal to noise ratio to achieve better out-of-plane velocity signal by LDV. The experimental setup is illustrated in FIG. 20. The LDV scanning results are illustrated in FIG. 21. FIG. 21 shows that the arrangement of PWAS transducers successfully generated the straight crested A0 Lamb wave modes. It also shows a minimal reflection from the plate edges due to the use of absorbing clay boundaries. At (b) and (c) FIG. 21 shows the scattered wave field from the pristine stiffener and at (d) and (e) is shown the scattered wave field from cracked stiffener. FIG. 21 also demonstrates that the scattered wave fields are straight crest waves after interacting with a discontinuity, as expected.

Figure 22:
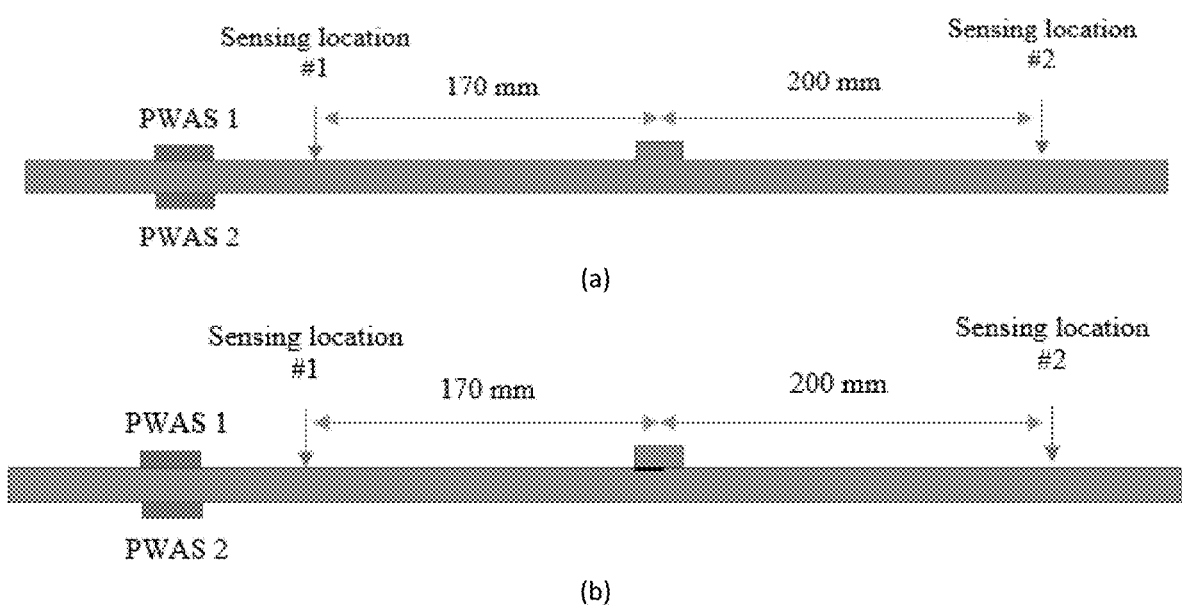
FIG. 22 illustrates LDV point measurement locations for comparison between analytical and experimental results for a pristine plate (a) and a cracked plate (b).
Figure 23A:
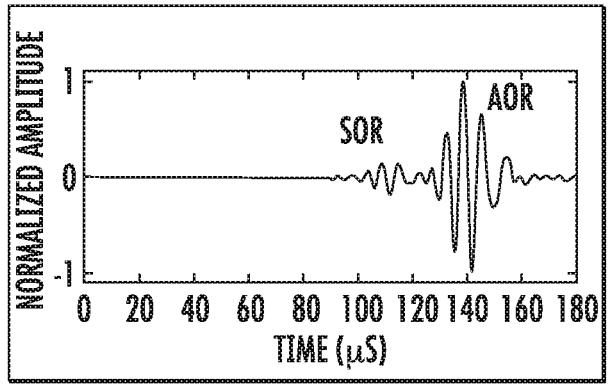
FIG. 23 presents experimental vs. global-local analytical results for different scattered Lamb waves from a pristine stiffener including: (a) analytical reflected waves (b) analytical transmitted waves (c) FFT of the analytical scattered waves (d) experimental reflected waves (e) experimental transmitted waves (f) FFT of the experimental scattered waves.
Figure 23B:
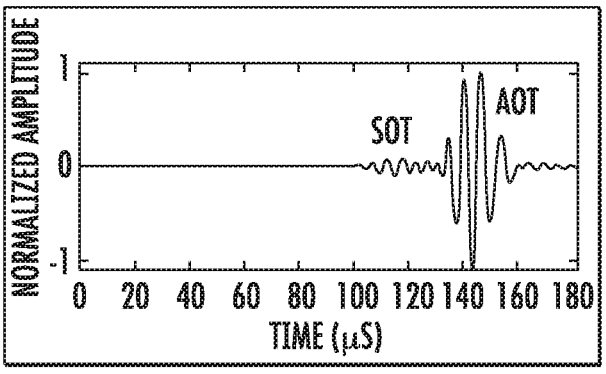
Figure 23C:
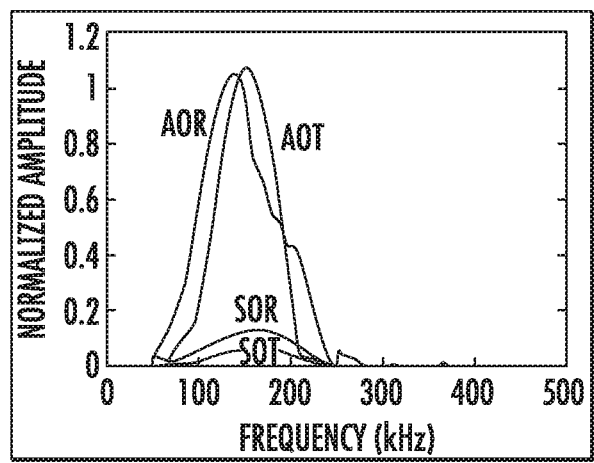
Figure 23D:
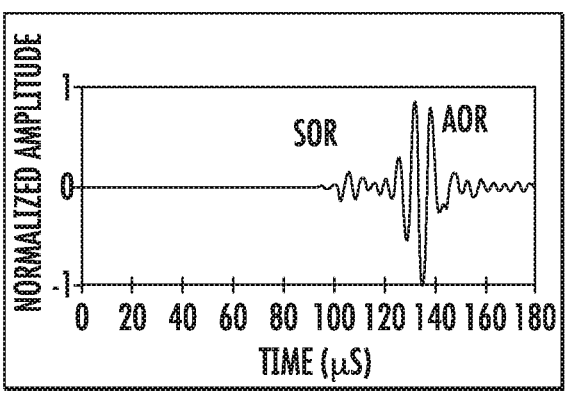
Figure 23E:
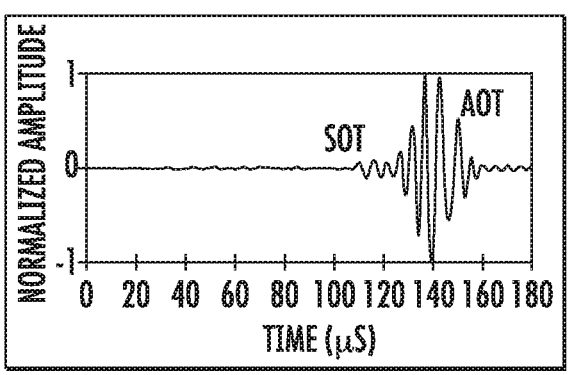
Figure 23F:
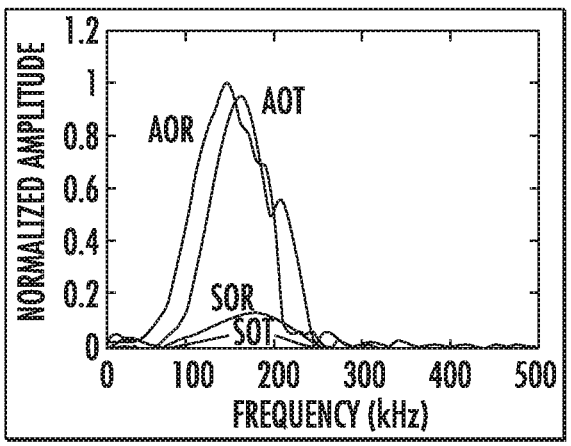
Figure 24A:
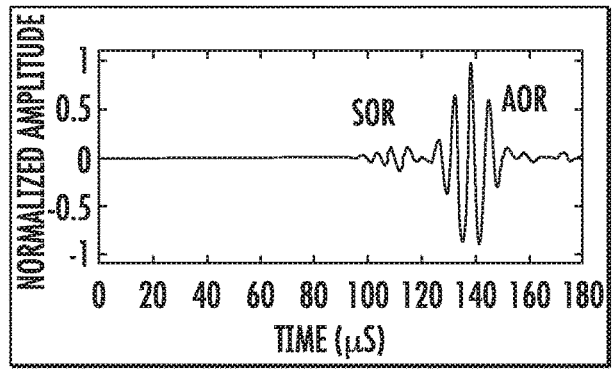
FIG. 24 provides experimental vs. global-local analytical results for different scattered Lamb waves from a cracked stiffener: (a) analytical reflected waves (b) analytical transmitted waves (c) FFT of the analytical scattered waves (d) experimental reflected waves (e) experimental transmitted waves (f) FFT of the experimental scattered waves.
Figure 24D:
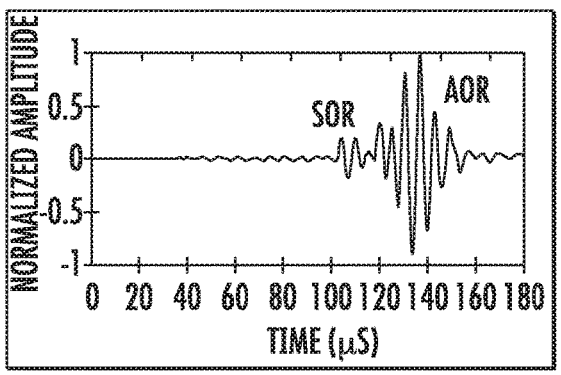
Figure 24B:
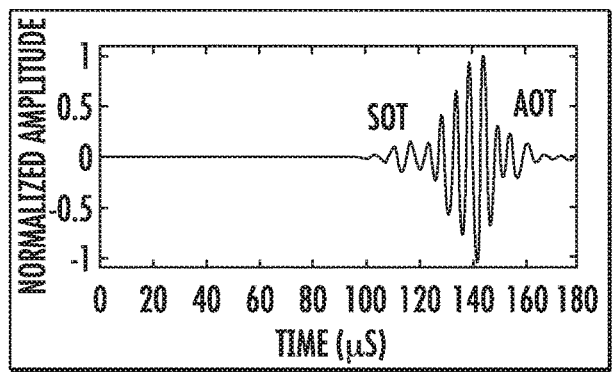
Figure 24E:
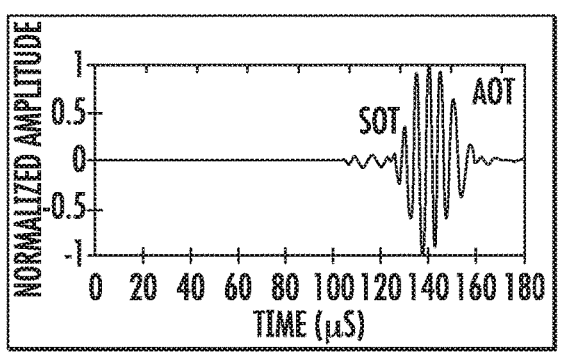
Figure 24C:
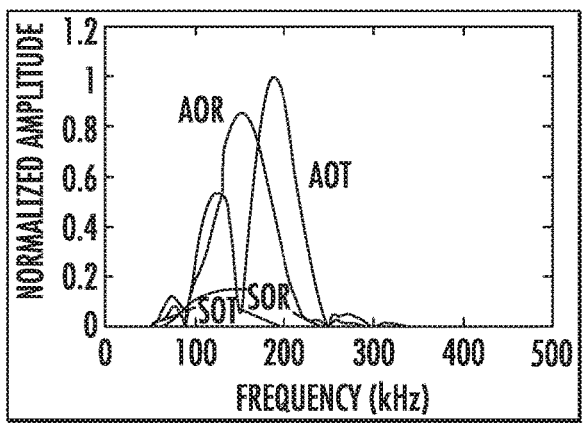
Figure 24F:
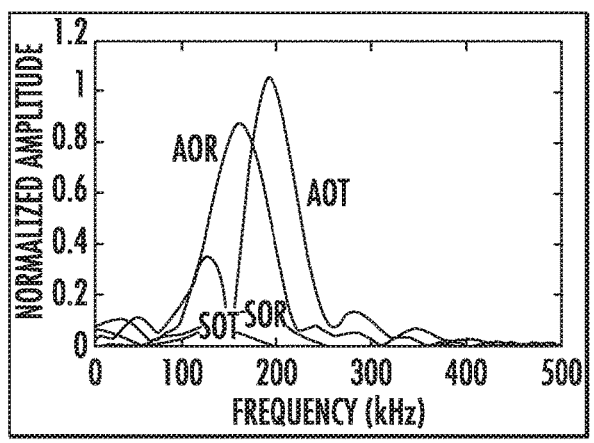

To compare the scattering coefficients of CMEP and global analytical results with experimental results, the out of plane velocity ($v_y$) was measured at a point on the plate surface using the LDV. Single point measurement locations are shown in FIG. 22 for the pristine plate (a) and the cracked plate (b). The reflected, and transmitted wave fields were measured at 170 mm and 200 mm, respectively, from the stiffener.

Experiment Vs. Analytical Analysis

A comparison of the experimental results and the proposed global-local analytical results was carried out. Scattering coefficients as determined above were fed into the global analytical method. About 30 seconds of computation time was needed for calculating the scatter coefficients. Insertion of the coefficients into the global analytical framework took about 10 seconds of computation time. Hence, the total simulation time was about 40 seconds. This simulation time was obtained for an incident 3-count tone burst time domain signal for a pair of actuator and sensor, and a crack damage at the center of the actuator and sensor. The algorithm of the steps of the global analytical solution to incorporate the local scattering coefficients was that shown in FIG. 15 and described above.

The results obtained from the global-local analytical approach are summarized in FIG. 23 and FIG. 24. In the global-local analysis, the signals were calculated at the same location where the signals were obtained experimentally (FIG. 22). The comparison between analytical and experimental scattered waveform, as well as FFT of the corresponding scattered waves of the pristine stiffener is illustrated in FIG. 23. Although it is difficult to have exact matching between two time-domain signals, the FFT of the two signals are in good agreement as depicted in FIG. 23(c), (f). Also, the reflected and transmitted Lamb waves show a similar pattern in the time-domain signals and their FFTs.

FIG. 24 shows the comparison of analytical and experimental scattered waveform, as well as FFT of the corresponding scattered waves for the cracked stiffener. The FFT of the two signals are in good agreement as depicted in FIG. 24(c), (f). The reflected and transmitted Lamb waves show a similar pattern in the time-domain signals and their FFTs.

The shifting in frequency response due to the presence of the crack is an important phenomenon to note. The transmitted A0 Lamb wave had a clear dip in frequency spectrum at 150 kHz that can be detected by both analytical and experimental results. Such information may be useful for crack detection in the complex geometry. This shows that global-local analytical is a reliable tool to predict the scattering of the Lamb waves from geometric discontinuities.

While certain embodiments of the disclosed subject matter have been described using specific terms, such description is for illustrative purposes only, and it is to be understood that changes and variations may be made without departing from the spirit or scope of the subject matter.

What is claimed is:

1. A computer-implemented method for detecting the presence and type of damage in a structure comprising:
    exciting a Lamb wave in a structure, the Lamb wave being excited at a transmitter and thence propagating through a base plate of the structure;
    detecting a scattered Lamb wave at a receiver, the scattered Lamb wave being a resulting wave generated by passage of the Lamb wave through the structure;
    analyzing the scattered Lamb wave that is detected at the receiver by a computing system comprising one or more computing devices, the analyzing incorporating previously determined frequency-dependent scattering coefficients of Lamb wave modes, wherein the previously determined frequency-dependent scattering coefficients have been determined prior to the step of analyzing the scattered Lamb wave from geometric discontinuities of a previously tested undamaged structure and a previously tested damaged structure, the previously determined frequency-dependent scattering coefficients having been determined by use of complex modes expansion with vector projection, the analyzing comprising insertion of the previously determined frequency-dependent scattering coefficients into a global analytical model to provide a first predicted signal solution for the structure in an undamaged state and a second predicted signal solution for the structure in a damaged state, the analyzing further comprising comparing the scattered Lamb wave to the first and second predicted signal solutions and thereby identifying a health state for the structure, the health state comprising information regarding the presence of a damage site in the structure and the type of damage at the damage site.

2. The computer-implemented method of claim 1, wherein the structure further comprises an extension joined to the base plate at a joint area, the Lamb wave propagating through the joint area.

3. The computer-implemented method of claim 2, wherein the extension is a stiffener.

4. The computer-implemented method of claim 2, wherein the extension is of unitary construction with the base plate.

5. The computer-implemented method of claim 2, wherein the extension is of separate construction and joined to the base plate.

6. The computer-implemented method of claim 1, wherein the structure comprises a polymeric laminate.

7. The computer-implemented method of claim 1, wherein the transmitter and the receiver comprise piezoelectric wafer active sensors.

8. The computer-implemented method of claim 1, wherein the Lamb wave is excited at a frequency of from about 50 kHz to about 350 kHz.

9. The computer-implemented method of claim 1, wherein the Lamb wave is excited from a tone-burst signal generator.

10. The computer-implemented method of claim 1, the structure forming one or more walls of a multi-ribbed box structure.

11. The computer-implemented method of claim 1, the structure being a component of an aircraft.

12. The computer-implemented method of claim 1, the method incorporating multiple data analysis units.

13. The computer-implemented method of claim 12, a first data analysis unit determining the frequency dependent scattering coefficients prior to the step of analyzing the scattered Lamb wave.

14. The computer-implemented method of claim 13, a second data analysis unit comparing the scattered Lamb wave to the first and second signal solutions.

15. The computer-implemented method of claim 1, the method further comprising insertion of the previously determined frequency dependent scattering coefficients into the global analytical model to provide one or more additional predicted signal solutions, each of the one or more additional predicted signal solutions being for the structure with different types or locations of damage, the analyzing further comprising comparing the scattered Lamb wave to the one or more additional predicted signal solutions.

16. The computer-implement method of claim 1, wherein the previously tested damaged structure comprises a crack in a joint area.

17. The computer-implemented method of claim 1, the global analytical model comprising:
    a) performing a Fourier transform of a time-domain excitation signal to obtain a frequency-domain excitation signal;
    b) calculating a frequency-domain structural transfer function up to a damage location;

c) multiplication of the frequency-domain structural transfer function by the frequency-domain excitation signal to obtain a frequency domain signal up to the damage location;
d) considering damage as a secondary wave source at the damage location using the frequency-dependent scattering coefficients;
e) calculating out-of-plane velocity in a frequency domain at a receiver location; and
f) performing an inverse Fourier transform to obtain a time-domain signal solution at a receiver sensing location.

\* \* \* \* \*